US012687702B2

(12) United States Patent (10) Patent No.: US 12,687,702 B2
Yang et al. (45) Date of Patent: Jul. 21, 2026

(54) CAMERA OPTICAL LENS

(71) Applicant: AAC OPTICS ( CHANGZHOU ) CO., LTD., Changzhou (CN)

(72) Inventors: Ke Yang, Changzhou (CN); Shunda Zhou, Changzhou (CN)

(73) Assignee: AAC OPTICS ( CHANGZHOU ) CO., LTD., Changzhou (CN)

( * ) Notice: Subject to any disclaimer, the term of this patent is extended or adjusted under 35 U.S.C. 154(b) by 253 days.

(21) Appl. No.: 18/735,208

(22) Filed: Jun. 6, 2024

(65) Prior Publication Data

US 2025/0251574 A1 Aug. 7, 2025

(30) Foreign Application Priority Data

Feb. 6, 2024 (CN) ........................ 202410172431.X

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/06; G02B 13/18
See application file for complete search history.

(56) References Cited

U.S. PATENT DOCUMENTS

| 9,442,277 | B1 * | 9/2016 | Shih | ........................ G02B 13/06 |
| 10,564,395 | B2 * | 2/2020 | Jia | ........................ G02B 13/0045 |
| 2019/0339490 | A1 * | 11/2019 | Tseng | ........................ G02B 13/04 |
| 2020/0301111 | A1 * | 9/2020 | Chen | ........................ G02B 13/04 |

* cited by examiner

*Primary Examiner* — Charles S Chang
(74) *Attorney, Agent, or Firm* — Wiersch Law Group

(57) ABSTRACT

A camera optical lens is provided, which includes seven lenses in sequence from an object side to an image side: a first lens, a second lens, a third lens, a fourth lens, a fifth lens, a sixth lens, and a seventh lens. The camera optical lens satisfies the following conditions: $-6.50 \leq f5/f6 \leq -2.30$, $0.035 \leq d6/TTL \leq 0.055$, and $-3.50 \leq R7/R8 \leq -1.80$. f5 represents a focal length of the fifth lens, f6 represents a focal length of the sixth lens, d6 represents an on-axis distance between the third lens and the fourth lens, TTL represents a total track length of the camera optical lens, R7 represents a central curvature radius of an object-side surface of the fourth lens, and R8 represents a central curvature radius of an image-side surface of the fourth lens.

13 Claims, 12 Drawing Sheets

Longitudinal Aberration

Millimeter

Millimeter

Millimeter

Longitudinal Aberration

Millimeter

Longitudinal Aberration

Millimeter

CAMERA OPTICAL LENS

CROSS REFERENCE TO RELATED APPLICATIONS

The present application claims the benefit of priority under the Paris Convention to Chinese Patent Application No. 202410172431.X, filed on Feb. 6, 2024, which is incorporated by reference herein in its entirety.

TECHNICAL FIELD

The present disclosure relates to the field of optical lenses, in particular to a camera optical lens suitable for a portable terminal device such as a smart phone and a digital camera, and a camera device such as a monitor, a PC lens and an in-vehicle lens.

BACKGROUND

In recent years, with the rise of various smart devices, the need for miniaturized camera optical lens is increasing day by day. In addition, due to the reduction of a pixel size of a sensor, and the development trend of an electronic product with good functionality and light and portable appearance, the miniaturized camera optical lens with good imaging quality has become the mainstream of the market at present. The camera optical lens with good imaging quality has become the mainstream in the current market. In order to obtain better imaging quality, a multi-piece lens structure is used. Moreover, with the development of technology and the increase of diversified needs of a user, the seven-piece lens structure is gradually appearing in the lens design under the condition that a pixel area of a photodevice is decreasing and the requirements of the system for the imaging quality are increasing. There is an urgent need for a wide-angle camera lens with excellent optical characteristics, small size and fully corrected aberration.

SUMMARY

In view of the above problems, a camera optical lens is provided according to the present disclosure, which has good optical performance and meets the design requirements of large aperture, ultra-thinness and ultra-wide angle.

In order to achieve the above object, a camera optical lens is provided according to the present disclosure, which includes seven lenses in sequence from an object side to an image side: a first lens with a negative refractive power, a second lens with a negative refractive power, a third lens with a positive refractive power, a fourth lens with a positive refractive power, a fifth lens with a positive refractive power, a sixth lens with a negative refractive power, and a seventh lens with a positive refractive power. The camera optical lens satisfies the following conditions: $-6.50 \leq f5/f6 \leq -2.30$, $0.035 \leq d6/TTL \leq 0.055$, and $-3.50 \leq R7/R8 \leq -1.80$. f5 represents a focal length of the fifth lens, f6 represents a focal length of the sixth lens, d6 represents an on-axis distance between the third lens and the fourth lens, TTL represents a total track length of the camera optical lens, R7 represents a central curvature radius of an object-side surface of the fourth lens, and R8 represents a central curvature radius of an image-side surface of the fourth lens.

As an improvement, the camera optical lens further satisfies the following condition: $0.15 \leq BFL/(TTL-BFL) \leq 0.25$, where BFL represents an on-axis distance from the seventh lens to an image surface.

As an improvement, the camera optical lens further satisfies the following condition: $1.50 \leq f7/f \leq 2.50$, where f7 represents a focal length of the seventh lens, and f represents a focal length of the camera optical lens.

As an improvement, the camera optical lens further satisfies the following condition: $35.00 \leq v5-v6 \leq 70.00$, where v5 represents an Abbe number of the fifth lens, and v6 represents an Abbe number of the sixth lens.

As an improvement, the camera optical lens further satisfies the following condition: $1.70 \leq n1 \leq 2.20$, where n1 represents a refractive index of the first lens.

As an improvement, the first lens has a convex object-side surface in a paraxial region, and has a concave image-side surface in the paraxial region. The camera optical lens further satisfies the following condition: $-6.18 \leq f1/f \leq -1.84$, $0.83 \leq (R1+R2)/(R1-R2) \leq 2.99$, and $0.02 \leq d1/TTL \leq 0.11$. Where f1 represents a focal length of the first lens, f represents a focal length of the camera optical lens, R1 represents a central curvature radius of the object-side surface of the first lens, R2 represents a central curvature radius of the image-side surface of the first lens, and d1 represent an on-axis thickness of the first lens.

As an improvement, the second lens has a convex object-side surface in a paraxial region, and has a concave image-side surface in the paraxial region. The camera optical lens satisfies the following conditions: $-6.67 \leq f2/f \leq -1.98$, $0.53 \leq (R3+R4)/(R3-R4) \leq 1.90$, and $0.003 \leq d3/TTL \leq 0.06$. Where f2 represents a focal length of the second lens, f represents a focal length of the camera optical lens, R3 represents a central curvature radius of the object-side surface of the second lens, R4 represents a central curvature radius of the image-side surface of the second lens, d3 represents an on-axis thickness of the second lens.

As an improvement, the third lens has a concave object-side surface in a paraxial region, and has a convex image-side surface in the paraxial region. The camera optical lens further satisfies the following conditions: $2.66 \leq f3/f \leq 8.82$, $1.05 \leq (R5+R6)/(R5-R6) \leq 3.65$, and $0.09 \leq d5/TTL \leq 0.31$. Where f3 represents a focal length of the third lens, f represents a focal length of the camera optical lens, R5 represents a central curvature radius of the object-side surface of the third lens, R6 represents a central curvature radius of the image-side surface of the third lens, and d5 represents an on-axis thickness of the third lens.

As an improvement, the fourth lens has a convex object-side surface in a paraxial region, and has a convex image-side surface in the paraxial region. The camera optical lens further satisfies the following conditions: $1.38 \leq f4/f \leq 4.36$, and $0.03 \leq d7/TTL \leq 0.14$. Where f4 represents a focal length of the fourth lens, f represents a focal length of the camera optical lens, and d7 represents an on-axis thickness of the fourth lens.

As an improvement, the fifth lens has a convex object-side surface in a paraxial region, and has a convex image-side surface in the paraxial region. The camera optical lens further satisfies the following conditions: $1.87 \leq f5/f \leq 17.58$, $-0.25 \leq (R9+R10)/(R9-R10) \leq 0.43$, and $0.04 \leq d9/TTL \leq 0.15$. Where f5 represents a focal length of the fifth lens, f represents a focal length of the camera optical lens, R9 represents a central curvature radius of the object-side surface of the fifth lens, R10 represents a central curvature radius of the image-side surface of the fifth lens, and d9 represents an on-axis thickness of the fifth lens.

As an improvement, the sixth lens has a concave object-side surface in a paraxial region, and has a concave image-side surface in the paraxial region. The camera optical lens further satisfies the following conditions: $-3.61 \leq f6/f \leq -0.99$, $0.18 \leq (R11+R12)/(R11-R12) \leq 1.24$, and $0.02 \leq d11/TTL \leq 0.06$. Where f6 represents a focal length of the sixth lens, f represents a focal length of the camera optical lens f, R11 represents a central curvature radius of the object-side surface of the sixth lens, R12 represents a central curvature radius of the image-side surface of the sixth lens, and d11 represents an on-axis thickness d11 of the sixth lens.

As an improvement, the seventh lens has a convex object-side surface in a paraxial region, and has a convex image-side surface in the paraxial region. The camera optical lens further satisfies the following conditions: $-0.98 \leq (R13+R14)/(R13-R14) \leq -0.26$, and $0.04 \leq d13/TTL \leq 0.21$. Where R13 represents a central curvature radius of the object-side surface of the seventh lens, R14 represents a central curvature radius of the image-side surface of the seventh lens, and d13 represents an on-axis thickness of the seventh lens.

As an improvement, the first lens is made of glass and the fourth lens is made of glass.

The beneficial effects of the present disclosure are that the camera optical lens according to the present disclosure has excellent optical characteristics and the characteristics of a large aperture, wide angle, and ultra-thinness, and is particularly suitable for use in a cell phone camera lens assembly, a WEB camera lens and an in-vehicle lens including a high-pixel camera element such as a CCD, a CMOS, and the like.

BRIEF DESCRIPTION OF THE DRAWINGS

In order for a clearer illustration of technical solutions in embodiments of the present disclosure or the conventional technology, the accompanying drawings will be briefly described hereinafter. Apparently, the drawings in the following description are only some embodiments of the present disclosure. Other drawings may be obtained by those skilled in the art base on these accompanying according to these drawings without any creative effort.

DETAILED DESCRIPTION OF THE EMBODIMENTS

Figure 1:
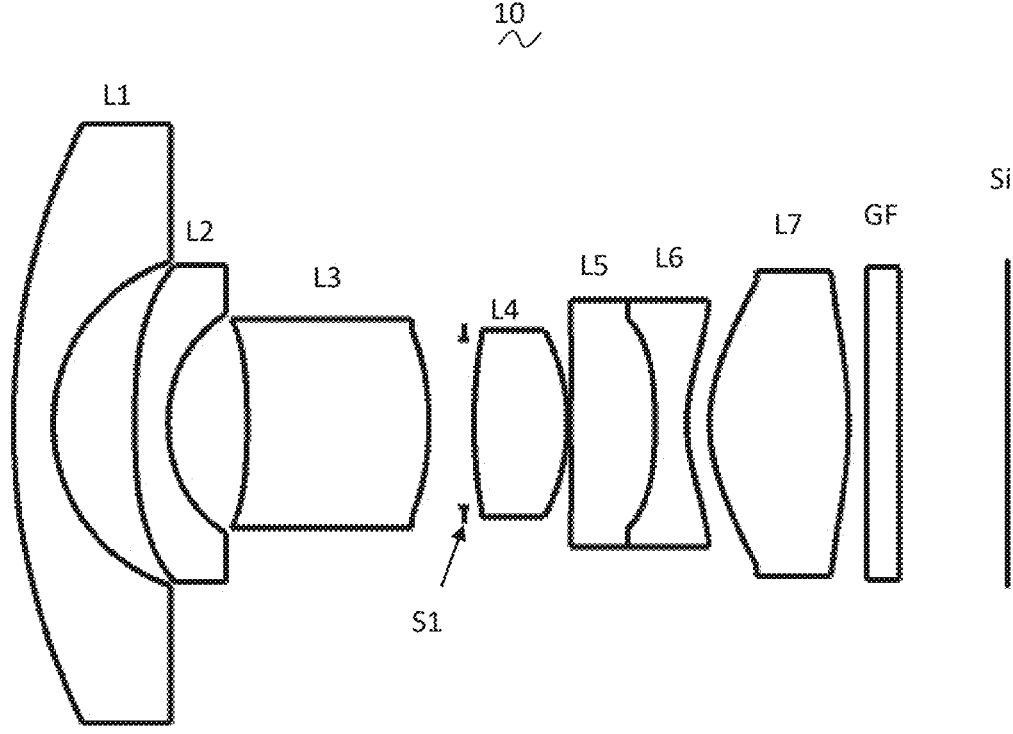
FIG. 1 is a schematic structural diagram of a camera optical lens according to a first embodiment of the present disclosure.

In order to make the objects, technical solution and advantages of the present disclosure clear, the various embodiments of the present disclosure will be described in detail in conjunction with the accompanying drawings. However, it can be understood by those skilled in the art that in various embodiments of the present disclosure, many technical details are proposed to enable the reader to better understand the present disclosure. However, even without these technical details and various changes and modifications based on the following embodiments, the technical solution required by the present disclosure can be realized.

In the drawings, a camera optical lens 10, a camera optical lens 20, a camera optical lens 30, a camera optical lens 40 and a camera optical lens 50 respectively shown in FIG. 1, FIG. 5, FIG. 9, FIG. 13 and FIG. 17 are provided according to the technical solutions of the present disclosure. Each of the camera optical lenses 10, 20, 30, 40, and 50 includes seven lenses, which in sequence from an object side to an image side are: a first lens L1, a second lens L2, a third lens L3, an aperture S1, a fourth lens L4, a fifth lens L5, a sixth lens L6, and a seventh lens L7. An optical element, such as an optical filter GF, may be provided between the seventh lens L7 and an image surface S1. The aperture S1 may be provided between the fourth lens and the fifth lens.

The first lens L1 is made of glass, the second lens L2 is made of plastic, the third lens L3 is made of plastic, the fourth lens L4 is made of glass, the fifth lens L5 is made of plastic, the sixth lens L6 is made of plastic, and the seventh lens L7 is made of plastic. Each lens may be made of other materials.

An object-side surface and an image-side surface of each of the first lens L1 and the fourth lens L4 are spherical, and an object-side surface and an image-side surface of each of the second lens L2, the third lens L3, the fifth lens L5, the sixth lens L6, and the seventh lens L7 are aspherical.

A focal length of the fifth lens L5 is defined as L5, a focal length of the sixth lens L6 is defined as f6, and the following condition is satisfied: $-6.50 \leq f5/f6 \leq -2.30$. A ratio of the focal lengths of the fifth lens L5 and the sixth lens L6 which are cemented together with each other is specified, so that a field curvature of the system can be effectively balanced within the range of the conditional equation, and an offset of the field curvature of a central field of view is less than 0.02 mm within the range of the conditional equation.

An on-axis distance between the third lens L3 and the fourth lens L4 is defined as d6, a total track length of the camera optical lens is defined as TTL. The following condition is satisfied: $0.035 \leq D6/TTL \leq 0.055$. A ratio of the on-axis distance between the third lens L3 and the fourth lens L4 to the total track length is specified, and both the third lens L3 and the fourth lens L4 are near a diaphragm S1, which is beneficial to smooth transition of the light near the diaphragm S1 and improvement of the imaging quality within the range of the conditional equation.

A central curvature radius of the object-side surface of the fourth lens L4 is defined as R7, a central curvature radius of the image-side surface of the fourth lens L4 is defined as R8, and the following condition is satisfied: $-3.50 \leq R7/R8 \leq -1.80$. A shape of the fourth lens L4 is specified, which is beneficial to smooth transition of light and improvement of the imaging quality within the range of the conditional equation.

In the case of satisfying the above conditional equations, the camera optical lenses 10, 20, 30, 40 and 50 have good optical performance and can meet the design requirements of large aperture, wide angle and ultra-thinness. According to the characteristics of the camera optical lenses 10, 20, 30, 40, and 50, the camera optical lenses 10, 20, 30, 40 and 50 are especially suitable for a cell phone camera lens assembly, a WEB camera lens and an in-vehicle lens including a high-pixel camera element such as a CCD and a CMOS.

Based on the above conditional equations and the functions that can be realized, the features of each lens are further refined as follows. The on-axis distance from the seventh lens L7 to an image surface S1 is defined as BFL, the total track length of the camera optical lens is defined as TTL, and the following condition is satisfied: $0.15 \leq BFL/(TTL-BFL) \leq 0.25$. A relationship between the back focus and the total track length is specified, which is beneficial to the assembly of modules on the basis of miniaturization. A lens group has a short length (TTL−BFL) and a compact structure, which reduces the sensitivity of the lens to MTF, improves the production yield and reduces the production cost.

A focal length of the seventh lens is defined as f7, a focal length of the camera optical lens is defined as f, and the following condition is satisfied: $1.50 \leq f7/f \leq 2.50$. A ratio of the last lens to the total focal length of the optical system is specified, which is beneficial to receiving light and ensuring the light flux by reasonably distributing the optical power of the system.

An Abbe number of the fifth lens L5 is defined as v5, an Abbe number of the sixth lens L6 is defined as v6, and the following condition is satisfied: $35.00 \leq v5-v6 \leq 70.00$. A difference of the Abbe numbers of the two cemented lenses is specified, so that the material properties can be effectively assigned and the lateral color can be efficiently corrected to satisfy $|LC| \leq 7.0$ m within the range of the conditional equation.

A refractive index of the first lens L1 is defined as n1, and the following condition is satisfied: $1.70 \leq n1 \leq 2.20$. Preferably, the first lens L1 is made of a material with high refractive index, which is beneficial to reducing the front-end aperture and improving the imaging quality.

The first lens L1 has a negative refractive power with a convex object-side surface in a paraxial region and a concave image-side surface of the first lens in the paraxial region, and the first lens L1 has negative refractive power.

The object-side surface and the image-side surface of the first lens L1 may be configured in other concave and convex arrangements.

A focal length of the camera optical lens is defined as f, a focal length of the first lens L1 as defined as f1, and the following condition is satisfied: $-6.18 \leq f1/f \leq -1.84$. A ratio of the focal length of the first lens L1 to the camera optical lens 10 is specified, which can effectively balance the field curvature of the system within the range of the conditional equation. Preferably, the following condition is satisfied: $-3.86 \leq f1/f \leq -2.30$.

A central curvature radius of the object-side surface of the first lens L1 is defined as R1, a central curvature radius of the image-side surface of the first lens L1 is defined as R2, and the following condition is satisfied: $0.83 \leq (R1+R2)/(R1-R2) \leq 2.99$. A shape of the first lens L1 is reasonably controlled, so that the first lens L1 can effectively correct the system spherical aberration. Preferably the following condition is satisfied: $1.32 \leq (R1+R2)/(R1-R2) \leq 2.39$.

An on-axis thickness of the first lens L1 is defined as d1, a total track length of the camera optical lens 10 is defined as TTL, and the following condition is satisfied: $0.02 \leq d1/TTL \leq 0.11$, which is beneficial to realizing ultra-thinness with the range of the conditional equation. Preferably, the following condition is satisfied: $0.03 \leq d1/TTL \leq 0.09$.

The second lens L2 has a negative refractive power with a convex object-side surface in a paraxial region and a concave image-side surface in the paraxial region. The object-side surface and the image-side surface of the second lens L2 may be configured in other concave and convex arrangements.

A focal length of the camera optical lens is defined as f, a focal length of the second lens L2 is defined as f2, and the following condition is satisfied: $-6.67 \leq f2/f \leq -1.98$, which is beneficial to correcting the aberration of the optical system by controlling the negative optical power of the second lens L2 within a reasonable range. Preferably, the following condition is satisfied: $-4.17 \leq f2/f \leq -2.48$.

A central curvature radius of the object-side surface of the second lens L2 is defined as R3, and a central curvature radius of the image-side surface of the second lens L2 is defined as R4, and the following condition is satisfied: $0.53 \leq (R3+R4)/(R3-R4) \leq 1.90$. A shape of the second lens L2 is reasonably controlled, so that the second lens L2 can effectively correct the system spherical aberration. Preferably, the following condition is satisfied: $0.85 \leq (R3+R4)/(R3-R4) \leq 1.52$.

An on-axis thickness of the second lens L2 is defined as d3, a total track length of the camera optical lens is defined as TTL, and the following condition is satisfied: $0.003 \leq d3/TTL \leq 0.06$, which is beneficial to realizing ultra-thinness within the range of the conditional equation. Preferably, the following condition is satisfied: $0.005 \leq d3/TTL \leq 0.05$.

The third lens L3 has a positive refractive power with a concave object-side surface in a paraxial region and a convex image-side surface in the paraxial region. The object-side surface and the image-side surface of the third lens L3 may be configured in other concave and convex arrangements.

A focal length of the camera optical lens is defined as f, a focal length of the third lens L3 is defined as f3, and the following condition is satisfied: $2.66 \leq f3/f \leq 8.82$. The system can have a good imaging quality and low sensitivity by reasonably distributing the optical power. Preferably, the following condition is satisfied: $4.25 \leq f3/f \leq 7.06$.

A central curvature radius of the object-side surface of the third lens L3 is defined as R5, a central curvature radius of the image-side surface of the third lens L3 is defined as R6, and the following condition is satisfied: 1.05≤(R5+R6)/(R5−R6)≤3.65. A shape of the fourth lens L4 is specified, which is beneficial to correcting the problem of on-axis chromatic aberration with the development of ultra-thinness and wide angle of the lenses within the range of the conditional equation. Preferably, the following condition is satisfied: 1.69≤(R5+R6)/(R5−R6)≤2.9.

An on-axis thickness of the third lens L3 is defined as d5, a total track length of the camera optical lens is defined as TTL, and the following condition is satisfied: 0.09≤d5/TTL≤0.31, which is beneficial to realizing ultra-thinness within the range of the conditional equation. Preferably, the following condition is satisfied: 0.15≤d5/TTL≤0.24.

The fourth lens L4 has a positive refractive power with a convex object-side surface in a paraxial region and a convex image-side surface in the paraxial region. The object-side surface and the image-side surface of the fourth lens L4 may be configured in other concave and convex arrangements.

A focal length of the camera optical lens is defined as f, a focal length of the fourth lens L4 is defined as f4, and the following condition is satisfied: 1.38≤f4/f≤4.36. The system can have a good imaging quality and low sensitivity by reasonably distributing the optical power. Preferably, the following condition is satisfied: 2.21≤f4/f≤3.49.

An on-axis thickness of the fourth lens L4 is defined as d7, a total track length of the camera optical lens is defined as TTL, and the following condition is satisfied: 0.03≤d7/TTL≤0.14, which is beneficial to realizing ultra-thinness within the range of the conditional equation. Preferably, the following condition is satisfied: 0.05≤d7/TTL≤0.11.

The fifth lens L5 has a positive refractive power with a convex object-side surface in a paraxial region and a convex image-side surface in the paraxial region has positive refractive power. The object-side surface and the image-side surface of the fifth lens L5 can also be configured in other concave and convex arrangements.

A focal length of the camera optical lens is defined as f, a focal length of the fifth lens L5 is defined as f5, and the following condition is satisfied: 1.87≤f5/f≤17.58. An angle of light of the camera optical lens 10 is smooth and the tolerance sensitivity is reduced by the limitation on the fifth lens L5. Preferably, the following condition is satisfied: 2.99≤f5/f≤14.07.

A central curvature radius of the object-side surface of the fifth lens L5 is defined as R9, a central curvature radius of the image-side surface of the fifth lens L5 is defined as R10, and the following condition is satisfied: −0.25≤(R9+R10)/(R9−R10)≤0.43. A shape of the fifth lens L5 is specified, which is beneficial to correcting the problem of astigmatism and distortion of the camera optical lens 10. Preferably, the following condition is satisfied: −0.15≤(R9+R10)/(R9−R10)≤0.34.

An on-axis thickness of the fifth lens L5 is defined as d9, a total track length of the camera optical lens is defined as TTL, and the following condition is satisfied 0.04≤d9/TTL≤0.15, which is beneficial to realizing ultra-thinness within the range of the conditional equation. Preferably, the following condition is satisfied: 0.07≤d9/TTL≤0.12.

The sixth lens L6 has a negative refractive power with a concave object-side surface in a paraxial region and a concave image-side surface in the paraxial region. The object-side surface and the image-side surface of the sixth lens L6 may be configured in other concave and convex arrangements.

A focal length of the camera optical lens is defined as f, a focal length of the sixth lens L6 is defined as f6, and the following condition is satisfied: −3.61≤f6/f≤−0.99. The system can have a good imaging quality and low sensitivity by reasonably distributing the optical power. Preferably, the following condition is satisfied: −2.26≤f6/f≤−1.24.

A central curvature radius of the object-side surface of the sixth lens L6 is defined as R11, a central curvature radius of the image-side surface of the sixth lens L6 is defined as R12, and the following condition is satisfied: 0.18≤(R11+R12)/(R11−R12)≤1.24. A shape of the sixth lens L6 is specified, which is beneficial to correcting the problem such as off-axis aberration with the development of ultra-thinness and wide angle within the range of the conditional equation. Preferably, the following condition is satisfied: 0.28≤(R11+R12)/(R11−R12)≤1.00.

An on-axis thickness of the sixth lens L6 is defined as d11, a total track length of the camera optical lens is defined as TTL, and the following condition is satisfied: 0.02≤d11/TTL≤0.06, which is beneficial to realizing ultra-thinness within the range of the conditional equation. Preferably, the following condition is satisfied: 0.03≤d11/TTL≤0.05.

The seventh lens L7 has a positive refractive power with a convex object-side surface in a paraxial region and a convex image-side surface in the paraxial region. The object-side surface and the image-side surface of the seventh lens L7 may be configured in other concave and convex arrangements.

A central curvature radius of the object-side surface of the seventh lens L7 is defined as R13, a central curvature radius of the image-side surface of the seventh lens L7 is defined as R14, the following condition is satisfied: −0.98≤(R13+R14)/(R13−R14)≤−0.26. A shape of the seventh lens L7 is specified, which is beneficial to correcting the problem such as off-axis aberration with the development of ultra-thinness and wide angle within the range of the conditional equation. Preferably, the following condition is satisfied: −0.61≤(R13+R14)/(R13−R14)≤−0.32.

An on-axis thickness of the seventh lens L7 is defined as d13, a total track length of the camera optical lens 10 is defined as TTL, and the following condition is satisfied: 0.04≤d13/TTL≤0.21, which is beneficial to realizing ultra-thinness within the range of the conditional equation. Preferably, the following condition is satisfied: 0.06≤d13/TTL≤0.17.

An image height of the camera optical lens is defined as IH, and a total track length of the camera optical lens 10 is defined as TTL, and the following condition is satisfied: TTL/IH≤6.68, which is beneficial to realizing ultra-thinness. Preferably, the following condition is satisfied: TTL/IH≤6.49.

A field of view FOV of the camera optical lens is greater than or equal to 176.40°, thereby realizing wide angle. Preferably, the field of view FOV is greater than or equal to 180.00°.

The camera optical lens has an F number FNO less than or equal to 1.95, thereby realizing a large aperture and good imaging performance of the camera optical lens. Preferably, the F number FNO of the camera optical lens is less than or equal to 1.90.

The camera optical lens according to the present disclosure will be described below by way of examples, and the symbols recorded in each example are shown below. The units of the focal length, the on-axis distance, the central curvature radius, the on-axis thickness, inflexion points and arrest point are all in units of mm.

TTL refers to the total track length (the distance o0n-axis from the object-side surface of the first lens L1 to the image surface S1) in units of mm.

The F number FNO refers to a ratio of the effective focal length of the camera optical lens to an entrance pupil diameter.

The technical solution of the present disclosure is described in detail with five embodiments. Moreover, a comparative embodiment is provided as a reference for explanation, and the technical effect of the present disclosure cannot be realized when the scope of the above conditional equation is exceeded.

First Embodiment

Tables 1 and 2 show the design data of the camera optical lens 10 according to the first embodiment of the present disclosure.

TABLE 1

|  | R |  | d |  | nd |  | vd |
|---|---|---|---|---|---|---|---|
| S1 | ∞ | d0= | −12.445 |  |  |  |  |
| R1 | 18.716 | d1= | 1.100 | nd1 | 1.7725 | v1 | 49.61 |
| R2 | 4.690 | d2= | 2.255 |  |  |  |  |
| R3 | 38.532 | d3= | 0.916 | nd2 | 1.5365 | v2 | 55.98 |
| R4 | 4.503 | d4= | 2.185 |  |  |  |  |
| R5 | −21.592 | d5= | 5.018 | nd3 | 1.6604 | v3 | 20.53 |
| R6 | −7.728 | d6= | 1.241 |  |  |  |  |
| R7 | 13.793 | d7= | 2.576 | nd4 | 1.4970 | v4 | 81.59 |
| R8 | −5.578 | d8= | 0.100 |  |  |  |  |
| R9 | 25.492 | d9= | 2.328 | nd5 | 1.5365 | v5 | 55.98 |
| R10 | −18.929 | d10= | 0.000 |  |  |  |  |
| R11 | −18.929 | d11= | 0.879 | nd6 | 1.6604 | v6 | 20.53 |
| R12 | 4.273 | d12= | 0.627 |  |  |  |  |
| R13 | 4.034 | d13= | 3.831 | nd7 | 1.5365 | v7 | 55.98 |
| R14 | −11.793 | d14= | 0.512 |  |  |  |  |
| R15 | ∞ | d15= | 0.900 | ndg | 1.5168 | vg | 64.21 |
| R16 | ∞ | d16= | 2.984 |  |  |  |  |

The meanings of the symbols are described as follows.

S1: aperture;

R: curvature radius at the center of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of second lens L2;

R5: central curvature radius of the object-side surface of the third lens L3;

R6: central curvature radius of the image-side surface of third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the optical filter GF;

R16: central curvature radius of the image-side surface of the optical filter GF;

d: on-axis thickness of the lens, the on-axis distance between the lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the optical filter GF;

d15: on-axis thickness of the optical filter GF;

d16: on-axis distance from the image-side surface of the optical filter GF to the image surface S1;

nd: refractive index of the d-line (the d-line is green light with a wavelength of 550 nm);

nd1: refractive index of the d-line of the first lens L1;

nd2: refractive index of the d-line of the second lens L2;

nd3: refractive index of the d-line of the third lens L3;

nd4: refractive index of the d-line of the fourth lens L4;

nd5: refractive index of the d-line of the fifth lens L5;

nd6: refractive index of the d-line of the sixth lens L6;

nd7: refractive index of the d-line of the seventh lens L7;

ndg: refractive index of the d-line of the optical filter GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

v7: Abbe number of the seventh lens L7;

vg: Abbe number of the optical filter GF.

Table 2 shows the aspherical data of each lens in the camera optical lens 10 according to the first embodiment of the present disclosure.

TABLE 2

| | Conic coefficient | Aspherical surface coefficients | | | | |
|---|---|---|---|---|---|---|
| | k | A4 | A6 | A8 | A10 | A12 |
| R3 | 7.1081E+01 | 5.5394E−03 | −7.7793E−04 | 1.1371E−04 | −1.2660E−05 | 9.7870E−07 |
| R4 | 4.3014E−01 | 6.1227E−03 | 1.8796E−04 | −6.7359E−04 | 3.3172E−04 | −8.7403E−05 |
| R5 | 3.3832E+01 | −1.7573E−03 | −5.6818E−04 | 2.8022E−04 | −9.3201E−05 | 1.8451E−05 |
| R6 | −1.4122E+01 | −4.7562E−03 | 3.2965E−04 | 3.0664E−05 | −3.4858E−05 | 1.2544E−05 |
| R9 | −2.8319E+02 | −1.8656E−03 | 2.9801E−04 | −4.0690E−04 | 2.1786E−04 | −6.7539E−05 |
| R10 | 1.2576E+01 | −1.6444E−02 | 4.2900E−03 | −4.6376E−04 | −1.9828E−04 | 9.0109E−05 |
| R11 | 1.2576E+01 | −1.6444E−02 | 4.2900E−03 | −4.6376E−04 | −1.9828E−04 | 9.0109E−05 |
| R12 | −6.7118E+00 | −5.7913E−03 | 2.1312E−03 | −5.8803E−04 | 1.0598E−04 | −1.3018E−05 |
| R13 | −3.3635E+00 | −4.3202E−03 | 1.2797E−03 | −2.3808E−04 | 3.3336E−05 | −3.4403E−06 |
| R14 | −1.0692E+02 | −6.6855E−03 | 1.6352E−03 | −3.0086E−04 | 4.2204E−05 | −4.1115E−06 |

| | Conic coefficient | Aspherical surface coefficients | | | |
|---|---|---|---|---|---|
| | k | A14 | A16 | A18 | A20 |
| R3 | 7.1081E+01 | −5.0332E−08 | 1.6449E−09 | −3.1121E−11 | 2.6723E−13 |
| R4 | 4.3014E−01 | 1.3821E−05 | −1.3134E−06 | 6.9230E−08 | −1.5602E−09 |
| R5 | 3.3832E+01 | −2.2261E−06 | 1.5581E−07 | −5.4786E−09 | 6.5689E−11 |
| R6 | −1.4122E+01 | −2.5449E−06 | 3.0139E−07 | −1.9310E−08 | 5.1572E−10 |
| R9 | −2.8319E+02 | 1.2812E−05 | −1.4639E−06 | 9.2461E−08 | −2.4765E−09 |
| R10 | 1.2576E+01 | −1.7219E−05 | 1.8131E−06 | −1.0205E−07 | 2.3820E−09 |
| R11 | 1.2576E+01 | −1.7219E−05 | 1.8131E−06 | −1.0205E−07 | 2.3820E−09 |
| R12 | −6.7118E+00 | 1.0669E−06 | −5.5242E−08 | 1.6154E−09 | −2.0126E−11 |
| R13 | −3.3635E+00 | 2.4804E−07 | −1.1729E−08 | 3.2457E−10 | −3.9755E−12 |
| R14 | −1.0692E+02 | 2.6788E−07 | −1.1186E−08 | 2.7032E−10 | −2.8668E−12 |

For convenience, the aspherical surfaces of each lens surfaces use the aspherical surfaces shown in formula (1) below. However, the present disclosure is not limited to the polynomial form of the aspherical surface shown in this formula (1).

$$z = (cr^2)/\{1 + [1 - (k+1)(c^2r^2)]^{1/2}\} + A4r^4 + A6r^6 + A8r^8 + \quad (1)$$
$$A10r^{10} + A12r^{12} + A14r^{14} + A16r^{16} + A18r^{18} + A20r^{20}$$

k represents the conic coefficient, A4, A6, A8, A10, A12, A14, A16, A18 and A20 represent the aspheric surface coefficients, C represents the curvature radius at the center of the optical surface, R represent a vertical distance between the point on the aspheric curve and the optical axis, and Z represent an aspheric depth (a vertical distance between the point on the aspheric surface at a distance of r from the optical axis and the tangent plane tangent to the vertex on the optical axis of the aspheric surface).

Figure 2:
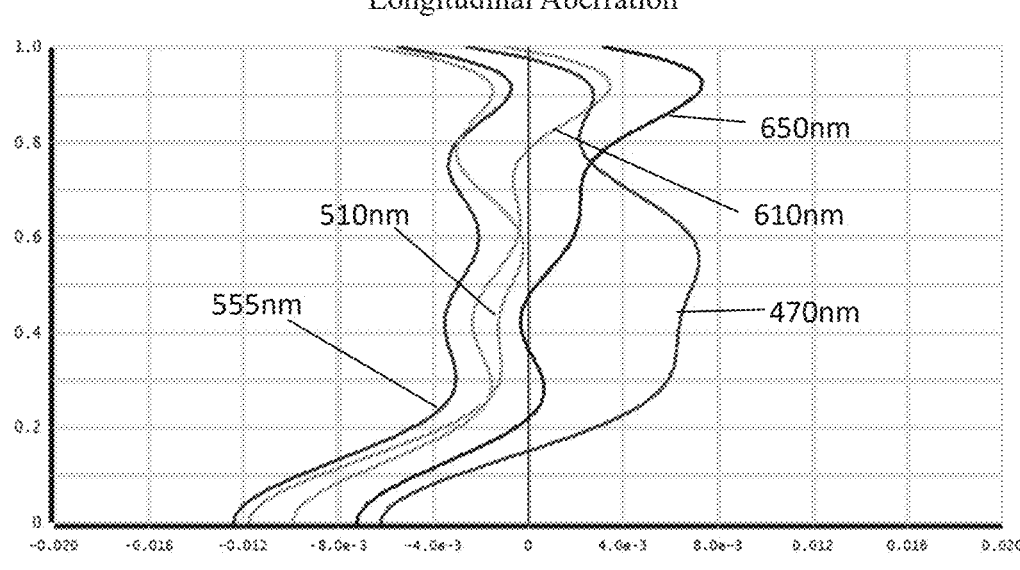
FIG. 2 is a schematic diagram of a longitudinal aberration of camera optical lens shown in FIG. 1.
Figure 3:
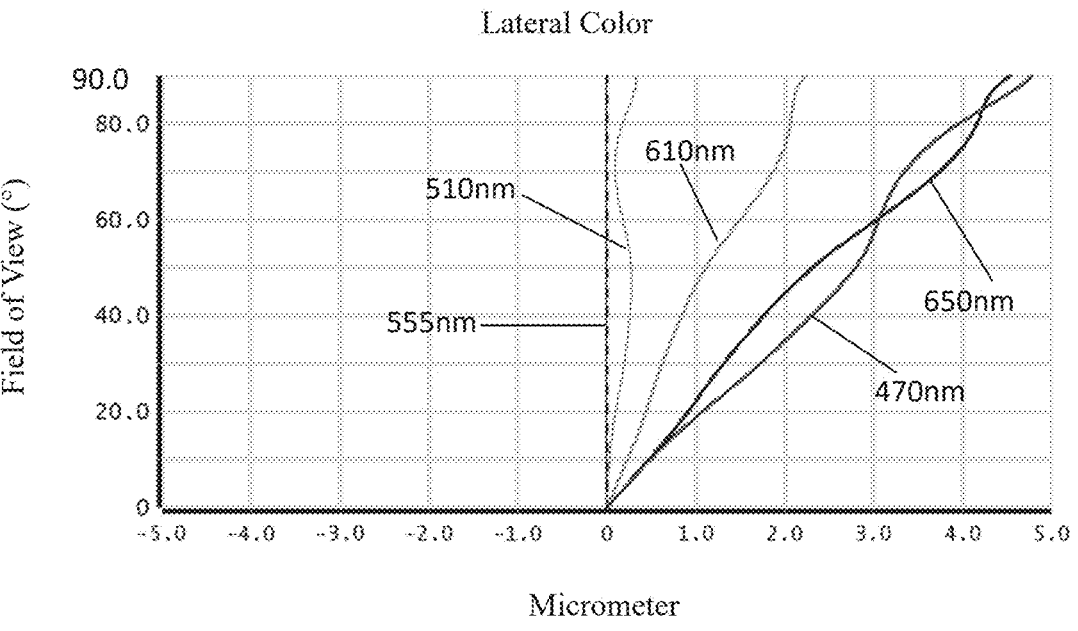
FIG. 3 is a schematic diagram of a lateral color of the camera optical lens shown in FIG. 1.
Figure 4:
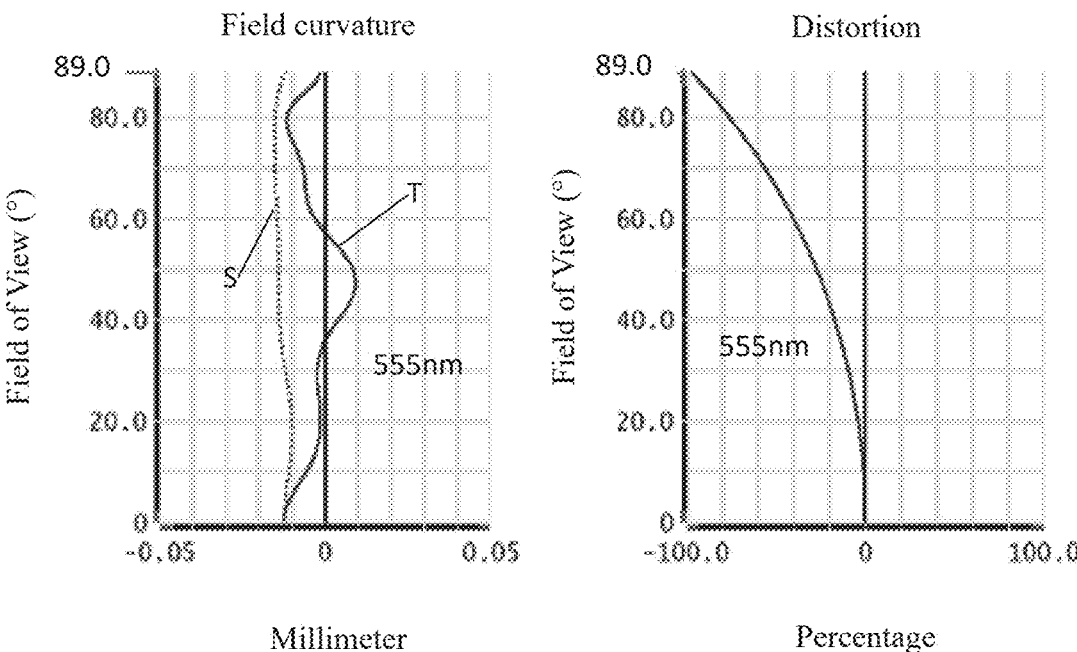
FIG. 4 is a schematic diagram of a field curvature and a distortion of the camera optical lens shown in FIG. 1.

FIG. 2 and FIG. 3 are a diagram of a longitudinal aberration and a diagram of a lateral color after lights with wavelengths of 650 nm, 610 nm, 555 nm, 510 nm and 470 nm passing through the camera optical lens 10 according to the first embodiment, respectively. FIG. 4 is a schematic diagram of a field curvature and a distortion after light with a wavelength of 555 nm passing through the camera optical lens 10 according to the first embodiment. A field curvature S in FIG. 4 is a field curvature in a sagittal direction, and T is a field curvature in a meridian direction.

In this embodiment, an entrance pupil diameter ENPD of the camera optical lens 10 is 1.544 mm, an image height IH of 1.0H is 4.320 mm, and a field of view FOV in a diagonal direction is 180.00°. Thus, the camera optical lens 10 meets the design requirements of large aperture, wide angle and ultra-thinness, and the on-axis aberration and the off-axis aberration are fully corrected, thereby achieving excellent optical characteristics.

Second Embodiment

The symbols in the second embodiment have the same meanings as the symbols in the first embodiment.

Figure 5:
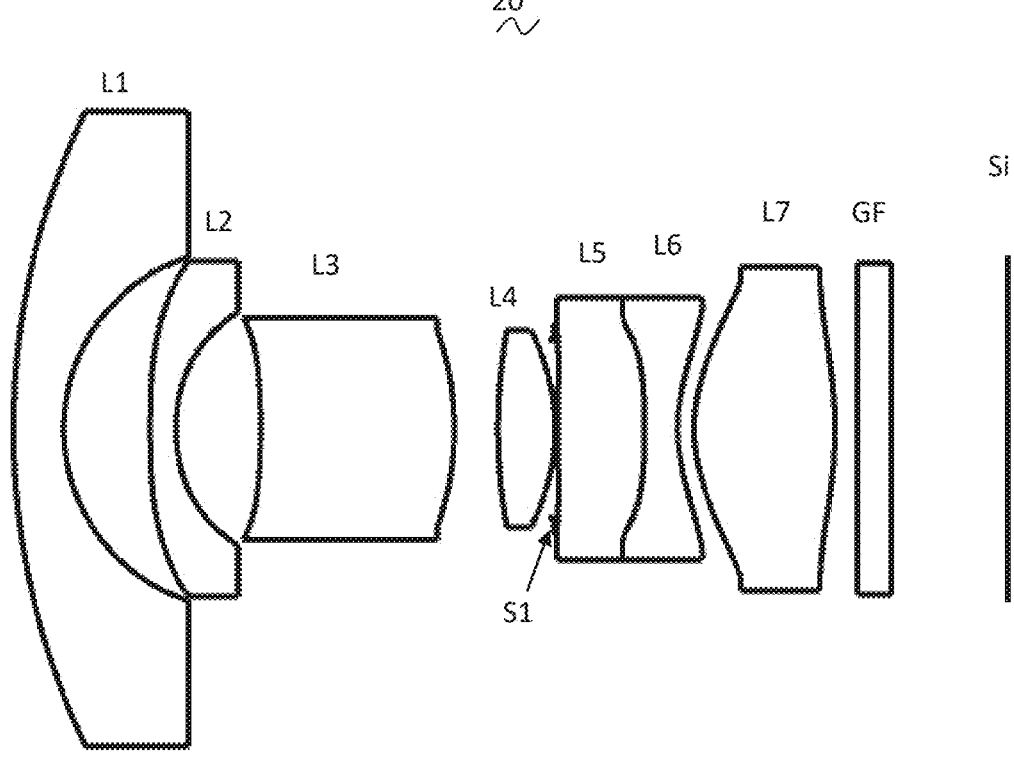
FIG. 5 is a schematic structural diagram of a camera optical lens according to a second embodiment of the present disclosure.

The camera optical lens 20 according to the second embodiment is shown in FIG. 5.

Table 3 and table 4 show the design data of the camera optical lens 20 according to the second embodiment of the present disclosure.

TABLE 3

| | R | d | | nd | | vd | |
|---|---|---|---|---|---|---|---|
| S1 | ∞ | d0= | −14.305 | | | | |
| R1 | 18.743 | d1= | 1.330 | nd1 | 1.7130 | v1 | 53.87 |
| R2 | 4.664 | d2= | 2.293 | | | | |
| R3 | 38.602 | d3= | 0.683 | nd2 | 1.5365 | v2 | 55.98 |
| R4 | 4.490 | d4= | 2.236 | | | | |
| R5 | −20.765 | d5= | 5.129 | nd3 | 1.6604 | v3 | 20.53 |
| R6 | −7.691 | d6= | 1.158 | | | | |
| R7 | 14.475 | d7= | 1.515 | nd4 | 1.4970 | v4 | 81.59 |
| R8 | −5.388 | d8= | 0.065 | | | | |
| R9 | 32.480 | d9= | 2.295 | nd5 | 1.5365 | v5 | 55.98 |
| R10 | −41.643 | d10= | 0.000 | | | | |
| R11 | −41.643 | d11= | 0.877 | nd6 | 1.6604 | v6 | 20.53 |
| R12 | 3.870 | d12= | 0.435 | | | | |
| R13 | 3.786 | d13= | 3.736 | nd7 | 1.5365 | v7 | 55.98 |
| R14 | −10.632 | d14= | 0.586 | | | | |
| R15 | ∞ | d15= | 0.900 | ndg | 1.5168 | vg | 64.21 |
| R16 | ∞ | d16= | 3.093 | | | | |

Table 4 illustrates the data of the aspherical surface of each lens in the camera optical lens 20 according to the second embodiment of the present disclosure.

TABLE 4

| | Conic coefficient | Aspherical surface coefficients | | | | |
|---|---|---|---|---|---|---|
| | k | A4 | A6 | A8 | A10 | A12 |
| R3 | 7.6065E+01 | 5.4528E−03 | −7.8589E−04 | 1.1357E−04 | −1.2652E−05 | 9.7910E−07 |
| R4 | 5.1687E−01 | 5.8717E−03 | 1.3346E−04 | −6.6674E−04 | 3.3198E−04 | −8.7402E−05 |
| R5 | 3.0909E+01 | −2.0431E−03 | −5.4167E−04 | 2.8181E−04 | −9.3035E−05 | 1.8435E−05 |
| R6 | −1.3300E+01 | −4.5836E−03 | 3.7617E−04 | 3.0104E−05 | −3.4863E−05 | 1.2526E−05 |
| R9 | −6.7439E+02 | −1.8841E−03 | 3.2616E−04 | −4.0362E−04 | 2.1824E−04 | −6.7578E−05 |
| R10 | 1.5188E+01 | −1.6675E−02 | 4.2449E−03 | −4.8839E−04 | −1.9742E−04 | 9.0286E−05 |
| R11 | 1.5188E+01 | −1.6675E−02 | 4.2449E−03 | −4.8839E−04 | −1.9742E−04 | 9.0286E−05 |
| R12 | −6.0163E+00 | −5.5369E−03 | 2.1198E−03 | −5.9029E−04 | 1.0594E−04 | −1.3007E−05 |
| R13 | −3.5812E+00 | −4.1717E−03 | 1.2999E−03 | −2.4037E−04 | 3.3176E−05 | −3.4369E−06 |
| R14 | −7.2244E+01 | −6.0461E−03 | 1.6317E−03 | −3.0152E−04 | 4.2202E−05 | −4.1118E−06 |

| | Conic coefficient | Aspherical surface coefficients | | | |
|---|---|---|---|---|---|
| | k | A14 | A16 | A18 | A20 |
| R3 | 7.6065E+01 | −5.0326E−08 | 1.6447E−09 | −3.1196E−11 | 2.6406E−13 |
| R4 | 5.1687E−01 | 1.3820E−05 | −1.3133E−06 | 6.9259E−08 | −1.5587E−09 |
| R5 | 3.0909E+01 | −2.2273E−06 | 1.5568E−07 | −5.4714E−09 | 6.5470E−11 |
| R6 | −1.3300E+01 | −2.5415E−06 | 3.0130E−07 | −1.9290E−08 | 5.1403E−10 |
| R9 | −6.7439E+02 | 1.2801E−05 | −1.4650E−06 | 9.2522E−08 | 2.4201E−09 |
| R10 | 1.5188E+01 | −1.7217E−05 | 1.8104E−06 | −1.0224E−07 | 2.5072E−09 |
| R11 | 1.5188E+01 | −1.7217E−05 | 1.8104E−06 | −1.0224E−07 | 2.5072E−09 |
| R12 | −6.0163E+00 | 1.0695E−06 | −5.4907E−08 | 1.6213E−09 | −2.5765E−11 |
| R13 | −3.5812E+00 | 2.4860E−07 | −1.1681E−08 | 3.2693E−10 | −4.3994E−12 |
| R14 | −7.2244E+01 | 2.6768E−07 | −1.1188E−08 | 2.7119E−10 | −2.8560E−12 |

Figure 6:
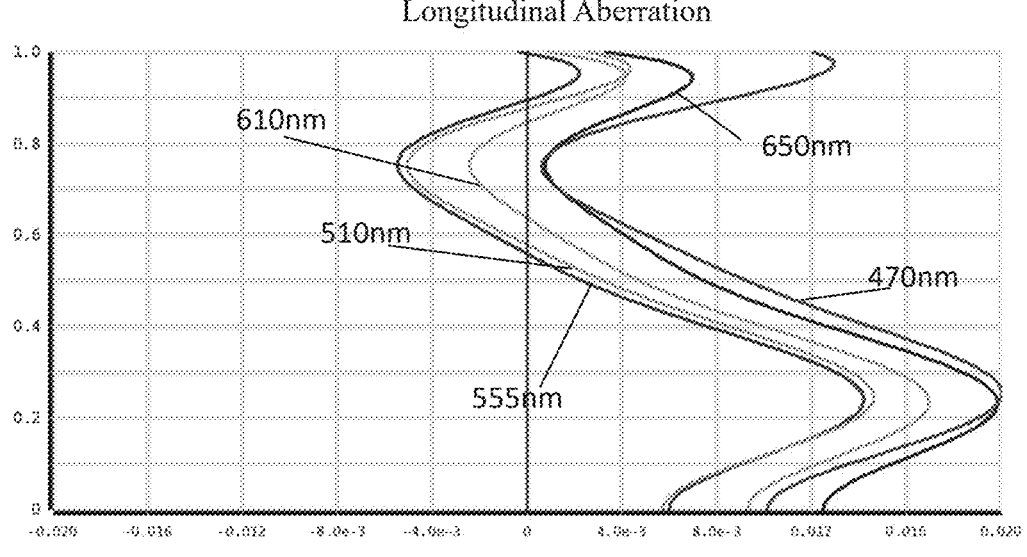
FIG. 6 is a schematic diagram of a longitudinal aberration of the camera optical lens shown in FIG. 5.
Figure 7:
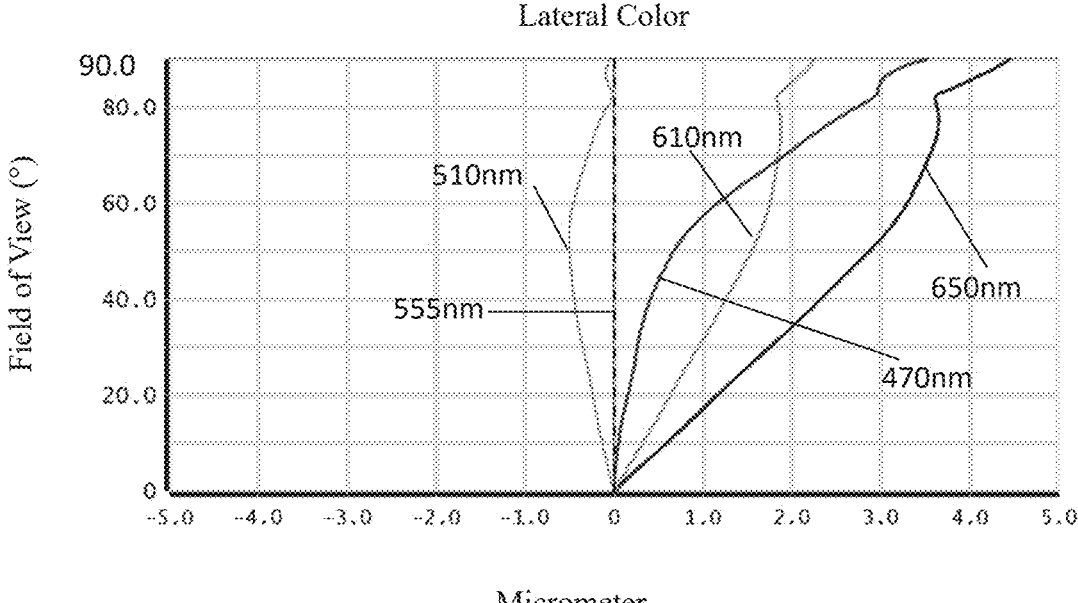
FIG. 7 is a schematic diagram of a lateral color of the camera optical lens shown in FIG. 5.
Figure 8:
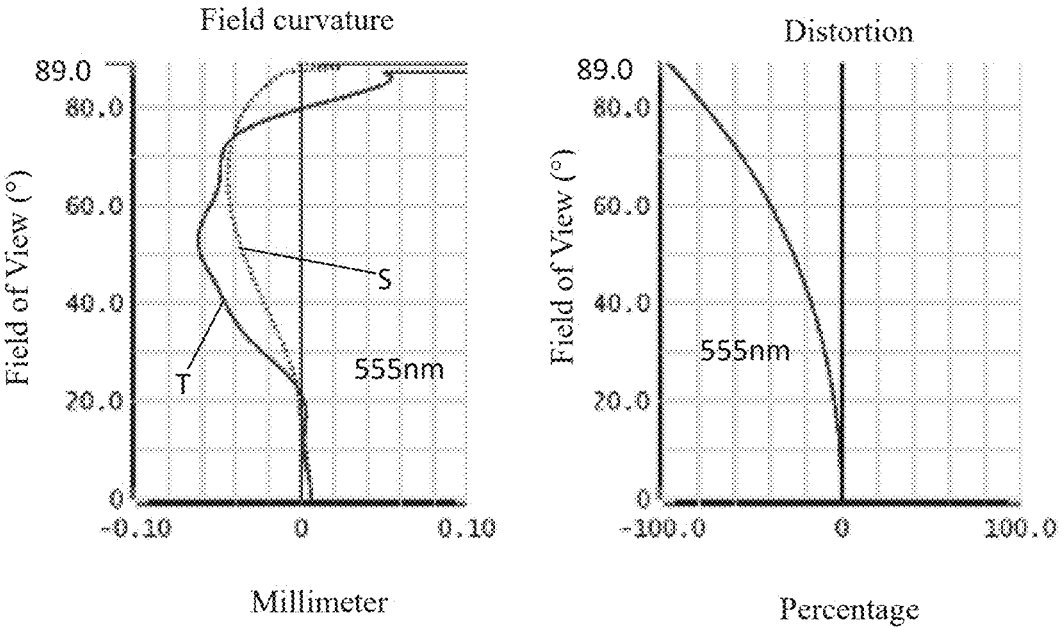
FIG. 8 is a schematic diagram of a field curvature and a distortion of the camera optical lens shown in FIG. 5.

FIG. 6 and FIG. 7 are a diagram of a longitudinal aberration and a diagram of a lateral color after light with wavelengths of 650 nm, 610 nm, 555 nm, 510 nm and 470 nm passing through the camera optical lens 20 according to the second embodiment, respectively. FIG. 8 is a schematic diagram of a field curvature and a distortion after light with a wavelength of 555 nm passing through the camera optical lens 20 according to the second embodiment. A field curvature S in FIG. 8 is a field curvature in a sagittal direction, and T is a field curvature in a meridian direction.

In this embodiment, an entrance pupil diameter ENPD of the camera optical lens 20 is 1.544 mm, an image height IH of 1.0H is 4.410 mm, and a field of view FOV in a diagonal direction is 180.00°. Thus, the camera optical lens 20 meets the design requirements of large aperture, wide angle and ultra-thinness, and the on-axis aberration and the off-axis aberration are fully corrected, thereby achieving excellent optical characteristics.

Third Embodiment

The symbols in the third embodiment have the same meanings as the symbols in the first embodiment.

Figure 9:
FIG. 9 is a schematic structural diagram of a camera optical lens according to a third embodiment of the present disclosure.
Figure 9:
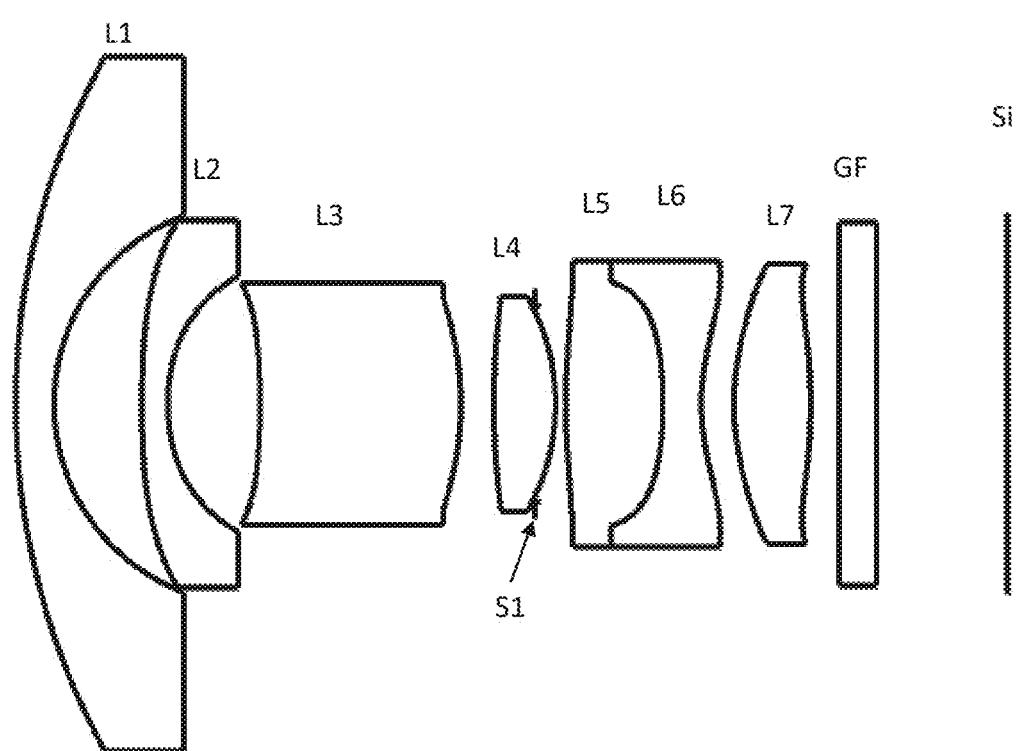

The camera optical lens 30 according to the third embodiment is shown in FIG. 9.

Table 5 and table 6 show the design data of the camera optical lens 30 according to the third embodiment of the present disclosure.

TABLE 5

| | R | | d | | nd | | vd | |
|---|---|---|---|---|---|---|---|---|
| S1 | ∞ | d0= | −12.423 | | | | | |
| R1 | 16.714 | d1= | 0.931 | nd1 | 1.7725 | v1 | 49.61 |
| R2 | 4.737 | d2= | 2.133 | | | | | |
| R3 | 43.261 | d3= | 0.626 | nd2 | 1.5365 | v2 | 55.98 |
| R4 | 4.518 | d4= | 2.240 | | | | | |
| R5 | −21.439 | d5= | 4.882 | nd3 | 1.6604 | v3 | 20.53 |
| R6 | −7.640 | d6= | 0.848 | | | | | |
| R7 | 17.852 | d7= | 1.500 | nd4 | 1.4970 | v4 | 81.59 |
| R8 | −5.106 | d8= | 0.050 | | | | | |
| R9 | 13.151 | d9= | 2.366 | nd5 | 1.5365 | v5 | 55.98 |
| R10 | −9.879 | d10= | 0.000 | | | | | |
| R11 | −9.879 | d11= | 0.928 | nd6 | 1.6604 | v6 | 20.53 |
| R12 | 4.754 | d12= | 0.788 | | | | | |
| R13 | 5.404 | d13= | 1.870 | nd7 | 1.5365 | v7 | 55.98 |
| R14 | −12.251 | d14= | 0.700 | | | | | |
| R15 | ∞ | d15= | 0.900 | ndg | 1.5168 | vg | 64.21 |
| R16 | ∞ | d16= | 3.176 | | | | | |

Table 6 illustrates the data of the aspherical surface of each lens in the camera optical lens 30 according to the third embodiment of the present disclosure.

TABLE 6

| Conic coefficient | | Aspherical surface coefficients | | | | |
|---|---|---|---|---|---|---|
| | k | A4 | A6 | A8 | A10 | A12 |
| R3 | 8.3710E+01 | 5.1623E−03 | −7.8492E−04 | 1.1373E−04 | −1.2648E−05 | 9.7885E−07 |
| R4 | 3.0844E−01 | 6.0247E−03 | 2.8136E−04 | −6.7233E−04 | 3.3170E−04 | −8.7346E−05 |
| R5 | 3.5727E+01 | −2.1389E−03 | −5.5474E−04 | 2.8211E−04 | −9.2977E−05 | 1.8459E−05 |
| R6 | −1.2814E+01 | −4.4949E−03 | 3.7908E−04 | 3.3815E−05 | −3.4717E−05 | 1.2534E−05 |
| R9 | −5.6110E+01 | −7.5603E−04 | 2.9278E−04 | −4.3060E−04 | 2.1951E−04 | −6.6536E−05 |
| R10 | −3.9559E+00 | −1.4202E−02 | 4.7126E−03 | −5.7646E−04 | −2.1398E−04 | 9.1162E−05 |
| R11 | −3.9559E+00 | −1.4202E−02 | 4.7126E−03 | −5.7646E−04 | −2.1398E−04 | 9.1162E−05 |
| R12 | −6.9638E+00 | −5.0944E−03 | 2.0952E−03 | −6.0839E−04 | 1.0540E−04 | −1.2860E−05 |
| R13 | −3.7720E+00 | −4.8025E−03 | 1.3035E−03 | −2.3221E−04 | 3.3171E−05 | −3.4737E−06 |
| R14 | −1.0726E+02 | −6.1399E−03 | 1.6799E−03 | −2.9271E−04 | 4.2410E−05 | −4.1272E−06 |

| Conic coefficient | | Aspherical surface coefficients | | | |
|---|---|---|---|---|---|
| | k | A14 | A16 | A18 | A20 |
| R3 | 8.3710E+01 | −5.0324E−08 | 1.6448E−09 | −3.1192E−11 | 2.6535E−13 |
| R4 | 3.0844E−01 | 1.3824E−05 | −1.3131E−06 | 6.9244E−08 | −1.5562E−09 |
| R5 | 3.5727E+01 | −2.2263E−06 | 1.5587E−07 | −5.4669E−09 | 6.2426E−11 |
| R6 | −1.2814E+01 | −2.5458E−06 | 3.0077E−07 | −1.9261E−08 | 5.2431E−10 |
| R9 | −5.6110E+01 | 1.2883E−05 | −1.4905E−06 | 8.5665E−08 | −1.3862E−09 |
| R10 | −3.9559E+00 | −1.6839E−05 | 1.8142E−06 | −1.1270E−07 | 3.0568E−09 |
| R11 | −3.9559E+00 | −1.6839E−05 | 1.8142E−06 | −1.1270E−07 | 3.0568E−09 |
| R12 | −6.9638E+00 | 1.0842E−06 | −5.6050E−08 | 1.3168E−09 | 3.3519E−13 |
| R13 | −3.7720E+00 | 2.4716E−07 | −1.1559E−08 | 3.4292E−10 | −4.8174E−12 |
| R14 | −1.0726E+02 | 2.6642E−07 | −1.1196E−08 | 2.7786E−10 | −2.3607E−12 |

Figure 10:
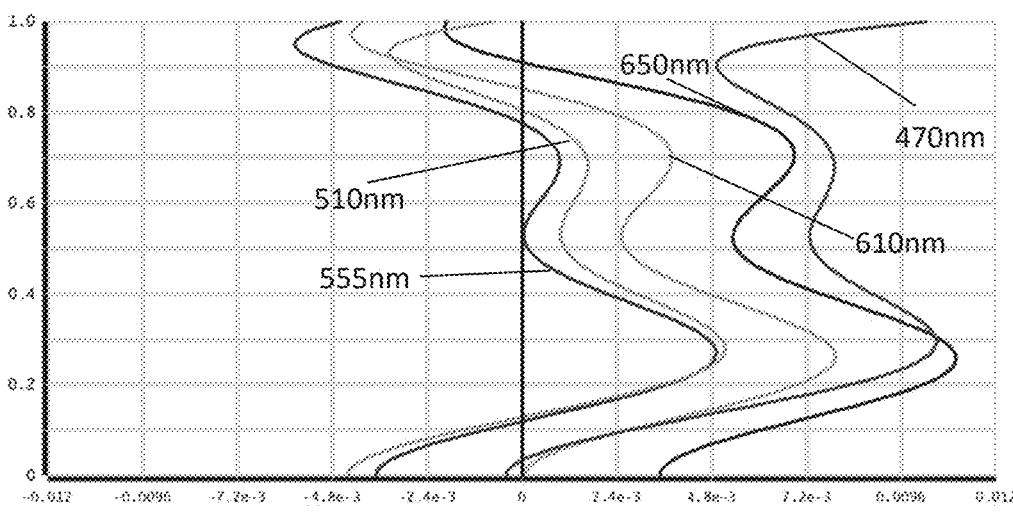
FIG. 10 is a schematic diagram of a longitudinal aberration of the camera optical lens shown in FIG. 9.
Figure 11:
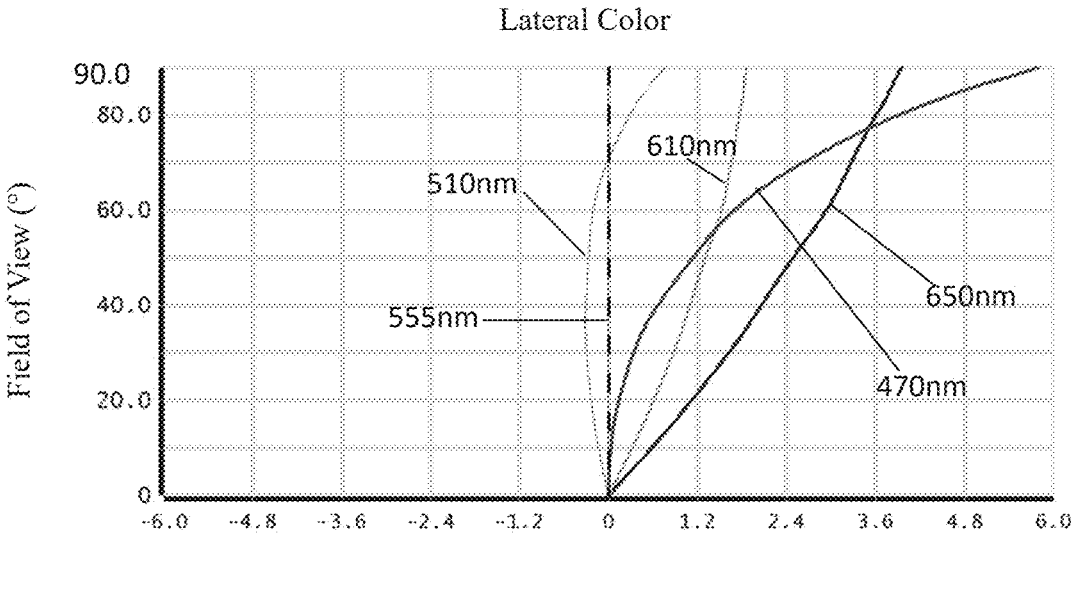
FIG. 11 is a schematic diagram of a lateral color of the camera optical lens shown in FIG. 9.
Figure 12:
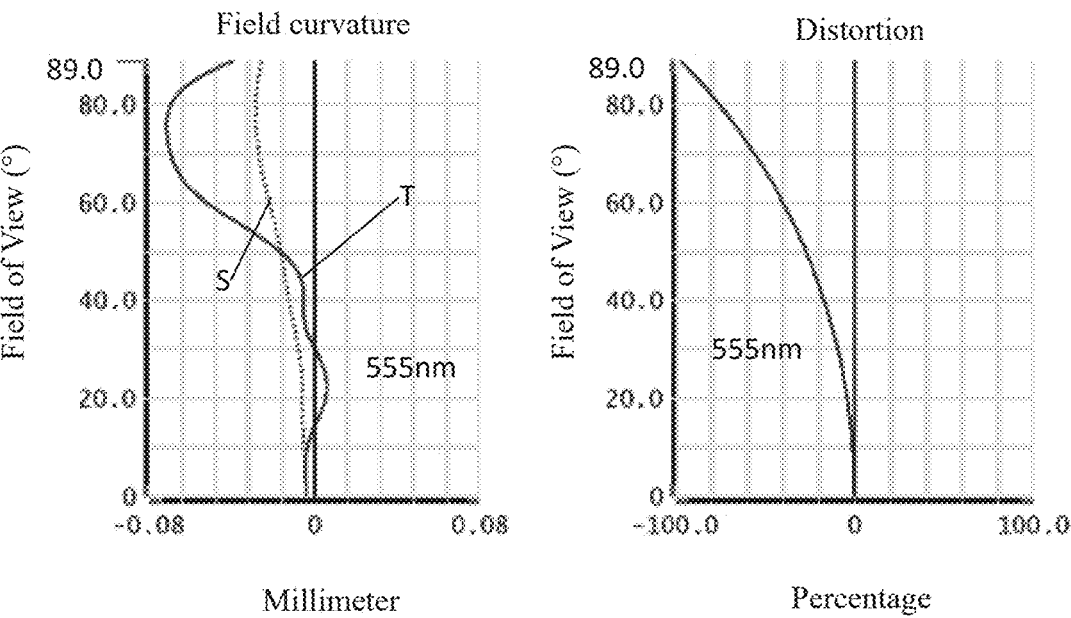
FIG. 12 is a schematic diagram of a field curvature and a distortion of the camera optical lens shown in FIG. 9.

FIG. 10 and FIG. 11 are a diagram of a longitudinal aberration and a diagram of a lateral color after light with wavelengths of 650 nm, 610 nm, 555 nm, 510 nm and 470 nm passing through the camera optical lens 30 according to the third embodiment, respectively. FIG. 12 is a schematic diagram of a field curvature and a distortion after light with a wavelength of 555 nm passing through the camera optical lens 30 according to the third embodiment. A field curvature S in FIG. 12 is a field curvature in a sagittal direction, and T is a field curvature in a meridian direction.

In this embodiment, an entrance pupil diameter ENPD of the camera optical lens 30 is 1.544 mm, an image height IH of 1.0H is 4.512 mm, and a field of view FOV in a diagonal direction is 180.00°. Thus, the camera optical lens 30 meets the design requirements of large aperture, wide angle and ultra-thinness, and the on-axis aberration and the off-axis aberration are fully corrected, thereby achieving excellent optical characteristics.

Fourth Embodiment

The symbols in the fourth embodiment have the same meanings as the symbols in the first embodiment.

Figure 13:
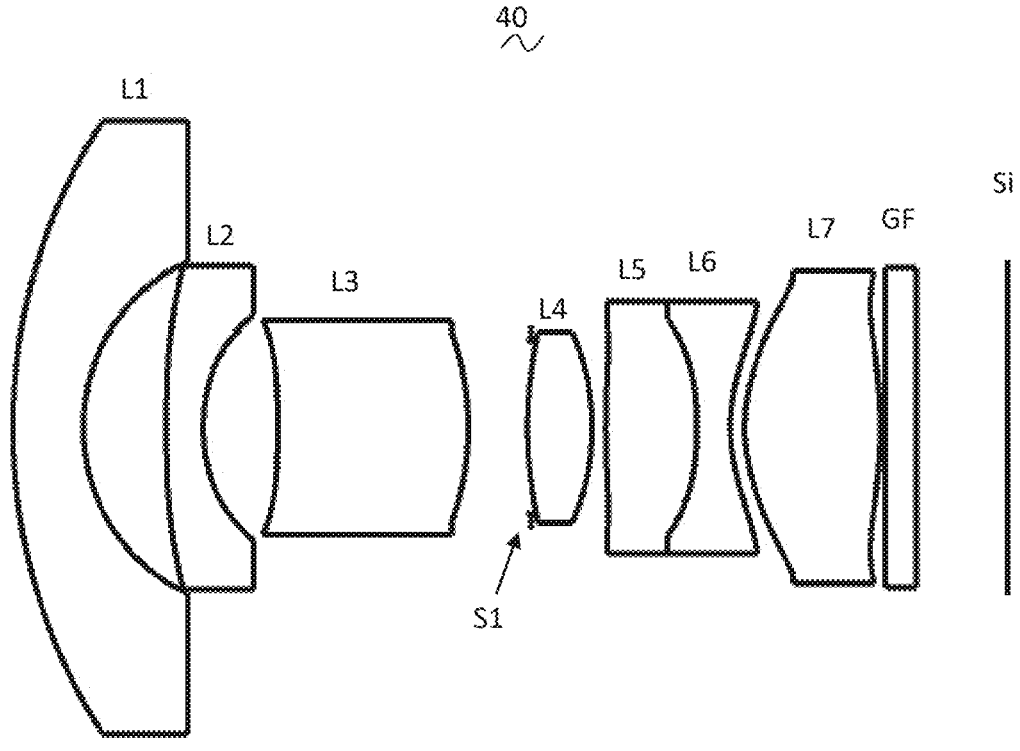
FIG. 13 is a schematic structural diagram of a camera optical lens according to a fourth embodiment of the present disclosure.

The camera optical lens 40 according to the fourth embodiment is shown in FIG. 13.

Table 7 and table 8 show the design data of the camera optical lens 40 according to the fourth embodiment of the present disclosure.

TABLE 7

| | R | | d | | nd | | vd | |
|---|---|---|---|---|---|---|---|---|
| S1 | ∞ | d0= | −14.317 | | | | | |
| R1 | 14.557 | d1= | 2.000 | nd1 | 2.0221 | v1 | 29.06 | |
| R2 | 4.834 | d2= | 1.967 | | | | | |
| R3 | 171.804 | d3= | 1.038 | nd2 | 1.5365 | v2 | 55.98 | |
| R4 | 4.757 | d4= | 2.128 | | | | | |
| R5 | −20.027 | d5= | 5.393 | nd3 | 1.6604 | v3 | 20.53 | |
| R6 | −7.430 | d6= | 1.495 | | | | | |
| R7 | 10.747 | d7= | 1.840 | nd4 | 1.4970 | v4 | 81.59 | |
| R8 | −5.966 | d8= | 0.380 | | | | | |
| R9 | 19.352 | d9= | 2.583 | nd5 | 1.5365 | v5 | 55.98 | |
| R10 | −10.752 | d10= | 0.000 | | | | | |
| R11 | −10.752 | d11= | 0.957 | nd6 | 1.6604 | v6 | 20.53 | |
| R12 | 3.984 | d12= | 0.406 | | | | | |
| R13 | 4.069 | d13= | 3.860 | nd7 | 1.5365 | v7 | 55.98 | |
| R14 | −11.375 | d14= | 0.124 | | | | | |
| R15 | ∞ | d15= | 0.900 | ndg | 1.5168 | vg | 64.21 | |
| R16 | ∞ | d16= | 2.589 | | | | | |

Table 8 illustrates the data of the aspherical surface of each lens in the camera optical lens 40 according to the fourth embodiment of the present disclosure.

TABLE 8

| Conic coefficient | | Aspherical surface coefficients | | | | |
|---|---|---|---|---|---|---|
| | k | A4 | A6 | A8 | A10 | A12 |
| R3 | −2.6933E+03 | 4.9673E−03 | −7.9358E−04 | 1.1370E−04 | −1.2654E−05 | 9.7904E−07 |
| R4 | 3.3056E−01 | 5.5759E−03 | 2.1820E−04 | −6.7956E−04 | 3.3141E−04 | −8.7390E−05 |
| R5 | 3.0698E+01 | −1.5349E−03 | −5.5970E−04 | 2.8044E−04 | −9.3241E−05 | 1.8456E−05 |
| R6 | −1.3775E+01 | −4.6554E−03 | 3.5219E−04 | 3.1243E−05 | −3.4931E−05 | 1.2539E−05 |
| R9 | −9.1862E+01 | −1.3818E−03 | 3.2207E−04 | −4.0884E−04 | 2.1749E−04 | −6.7563E−05 |
| R10 | −1.0537E−01 | −1.6929E−02 | 4.4523E−03 | −4.5803E−04 | −1.9860E−04 | 9.0115E−05 |
| R11 | −1.0537E−01 | −1.6929E−02 | 4.4523E−03 | −4.5803E−04 | −1.9860E−04 | 9.0115E−05 |

TABLE 8-continued

| | | | | | | |
|---|---|---|---|---|---|---|
| R12 | −5.3038E+00 | −4.9995E−03 | 2.1480E−03 | −5.9008E−04 | 1.0581E−04 | −1.3024E−05 |
| R13 | −3.0012E+00 | −4.3244E−03 | 1.2938E−03 | −2.3684E−04 | 3.3304E−05 | −3.4464E−06 |
| R14 | −9.9630E+01 | −6.0429E−03 | 1.6143E−03 | −2.9910E−04 | 4.2325E−05 | −4.1092E−06 |

| | Conic coefficient | Aspherical surface coefficients | | | |
|---|---|---|---|---|---|
| | k | A14 | A16 | A18 | A20 |
| R3 | −2.6933E+03 | −5.0307E−08 | 1.6464E−09 | −3.1145E−11 | 2.5946E−13 |
| R4 | 3.3056E−01 | 1.3823E−05 | −1.3132E−06 | 6.9259E−08 | −1.5567E−09 |
| R5 | 3.0698E+01 | −2.2241E−06 | 1.5605E−07 | −5.4725E−09 | 6.0582E−11 |
| R6 | −1.3775E+01 | −2.5455E−06 | 3.0136E−07 | −1.9317E−08 | 5.1655E−10 |
| R9 | −9.1862E+01 | 1.2812E−05 | −1.4634E−06 | 9.2542E−08 | −2.4885E−09 |
| R10 | −1.0537E−01 | −1.7217E−05 | 1.8119E−06 | −1.0231E−07 | 2.4350E−09 |
| R11 | −1.0537E−01 | −1.7217E−05 | 1.8119E−06 | −1.0231E−07 | 2.4350E−09 |
| R12 | −5.3038E+00 | 1.0672E−06 | −5.5161E−08 | 1.6208E−09 | −2.0623E−11 |
| R13 | −3.0012E+00 | 2.4781E−07 | −1.1716E−08 | 3.2644E−10 | −4.0526E−12 |
| R14 | −9.9630E+01 | 2.6769E−07 | −1.1207E−08 | 2.6959E−10 | −2.7937E−12 |

Figure 14:
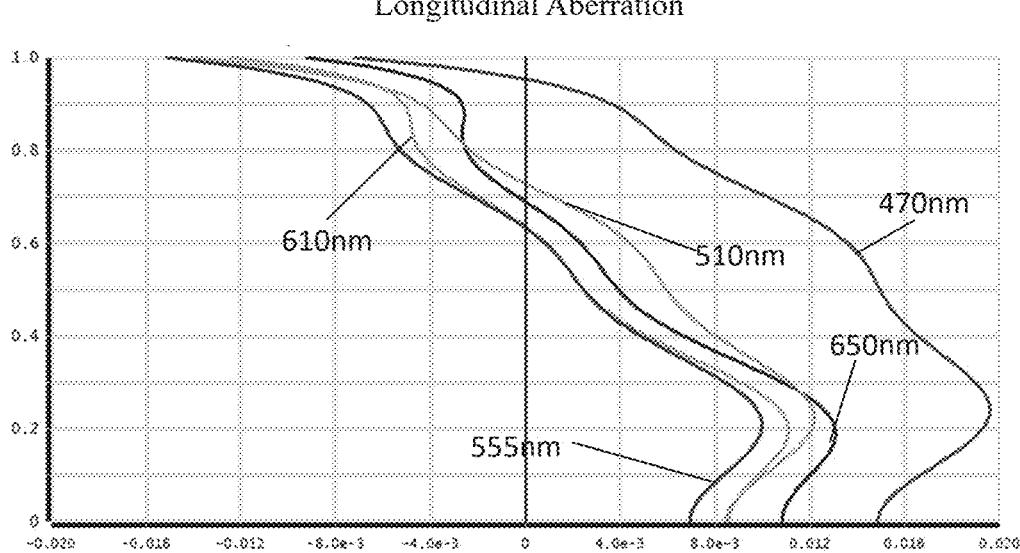
FIG. 14 is a schematic diagram of a longitudinal aberration of the camera optical lens shown in FIG. 13.
Figure 15:
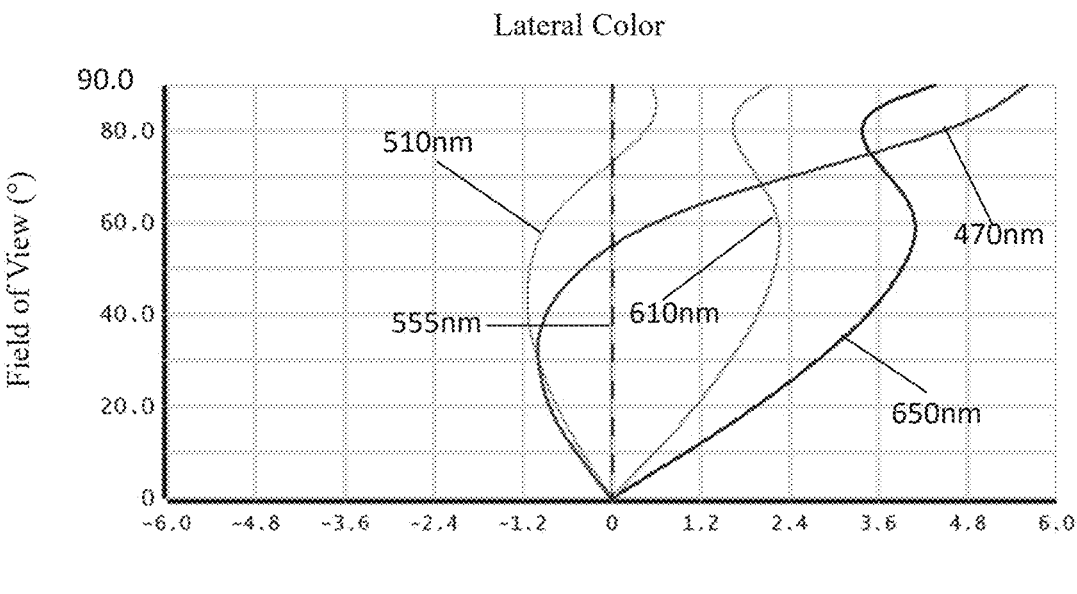
FIG. 15 is a schematic diagram of a lateral color of the camera optical lens shown in FIG. 13.
Figure 16:
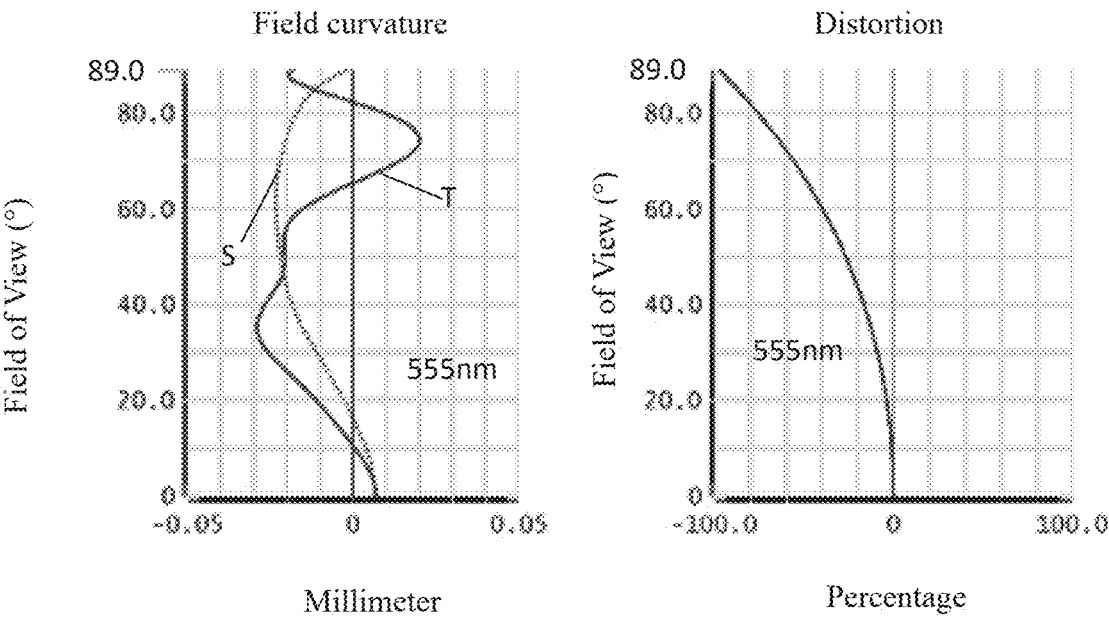
FIG. 16 is a schematic diagram of a field curvature and a distortion of the camera optical lens shown in FIG. 13.

FIG. 14 and FIG. 15 are a diagram of a longitudinal aberration and a diagram of a lateral color after light with wavelengths of 650 nm, 610 nm, 555 nm, 510 nm and 470 nm passing through the camera optical lens 40 according to the fourth embodiment, respectively. FIG. 16 is a schematic diagram of a field curvature and a distortion after light with a wavelength of 555 nm passing through the camera optical lens 40 according to the fourth embodiment. A field curvature S in FIG. 16 is a field curvature in a sagittal direction, and T is a field curvature in a meridian direction.

In this embodiment, an entrance pupil diameter ENPD of the camera optical lens 40 is 1.544 mm, an image height IH of 1.0H is 4.349 mm, and a field of view FOV in a diagonal direction is 180.00°. Thus, the camera optical lens 40 meets the design requirements of large aperture, wide angle and ultra-thinness, and the on-axis aberration and the off-axis aberration are fully corrected, thereby achieving excellent optical characteristics.

Fifth Embodiment

The symbols in the fifth embodiment have the same meanings as the symbols in the first embodiment.

Figure 17:
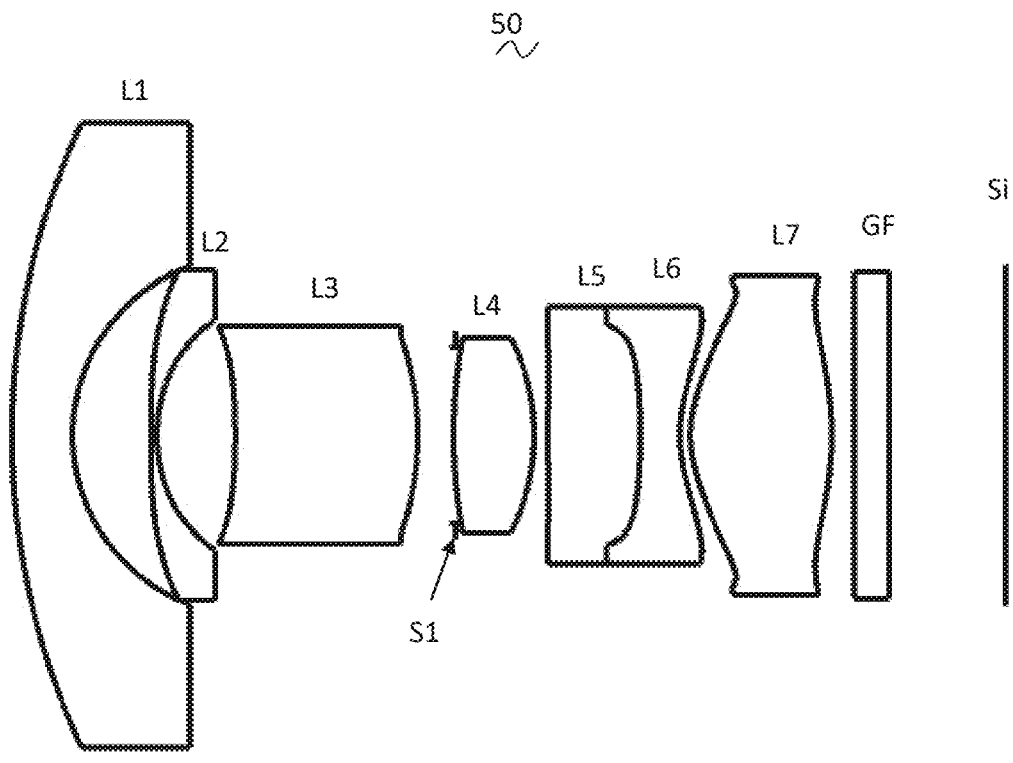
FIG. 17 is a schematic structural diagram of a camera optical lens according to a fifth embodiment of the present disclosure.

The camera optical lens 50 according to the fifth embodiment is shown in FIG. 17.

Table 9 and table 10 show the design data of the camera optical lens 50 according to the fifth embodiment of the present disclosure.

TABLE 9

| | R | | d | | nd | | vd | |
|---|---|---|---|---|---|---|---|---|
| S1 | ∞ | d0= | −11.675 | | | | | |
| R1 | 19.404 | d1= | 1.593 | nd1 | 1.7725 | v1 | 49.61 | |
| R2 | 4.772 | d2= | 2.067 | | | | | |
| R3 | 78.842 | d3= | 0.161 | nd2 | 1.5365 | v2 | 55.98 | |
| R4 | 4.417 | d4= | 2.063 | | | | | |
| R5 | −18.812 | d5= | 4.814 | nd3 | 1.6604 | v3 | 20.53 | |
| R6 | −7.845 | d6= | 0.941 | | | | | |
| R7 | 13.984 | d7= | 2.123 | nd4 | 1.4970 | v4 | 81.59 | |
| R8 | −5.653 | d8= | 0.355 | | | | | |
| R9 | 31.277 | d9= | 2.444 | nd5 | 1.4959 | v5 | 81.65 | |
| R10 | −27.296 | d10= | 0.000 | | | | | |
| R11 | −27.296 | d11= | 1.031 | nd6 | 1.6604 | v6 | 20.53 | |
| R12 | 3.283 | d12= | 0.291 | | | | | |
| R13 | 2.928 | d13= | 3.729 | nd7 | 1.5365 | v7 | 55.98 | |
| R14 | −8.084 | d14= | 0.597 | | | | | |
| R15 | ∞ | d15= | 0.900 | ndg | 1.5168 | vg | 64.21 | |
| R16 | ∞ | d16= | 3.085 | | | | | |

Table 10 illustrates the data of the aspherical surface of each lens in the camera optical lens 50 according to the fifth embodiment of the present disclosure.

TABLE 10

| | Conic coefficient | Aspherical surface coefficients | | | | |
|---|---|---|---|---|---|---|
| | k | A4 | A6 | A8 | A10 | A12 |
| R3 | 8.0254E+01 | 5.1064E−03 | −7.7887E−04 | 1.1399E−04 | −1.2639E−05 | 9.7947E−07 |
| R4 | 3.1101E−01 | 4.2238E−03 | 2.6764E−04 | −6.7170E−04 | 3.3154E−04 | −8.7406E−05 |
| R5 | 3.0874E+01 | −2.0945E−03 | −4.9275E−04 | 2.8454E−04 | −9.3162E−05 | 1.8441E−05 |
| R6 | −1.5499E+01 | −4.6186E−03 | 3.5032E−04 | 3.4773E−05 | −3.4299E−05 | 1.2532E−05 |
| R9 | −6.2606E+02 | −1.9233E−03 | 3.5916E−04 | −4.0029E−04 | 2.1786E−04 | −6.7610E−05 |
| R10 | −3.0855E+02 | 1.3514E−02 | 4.0355E−03 | −4.8307E−04 | −1.9800E−04 | 9.0263E−05 |
| R11 | −3.0855E+02 | 1.3514E−02 | 4.0355E−03 | −4.8307E−04 | −1.9800E−04 | 9.0263E−05 |
| R12 | −7.1533E+00 | −5.9939E−03 | 2.1380E−03 | −5.8849E−04 | 1.0578E−04 | −1.3041E−05 |
| R13 | −4.6801E+00 | −3.9760E−03 | 1.2816E−03 | −2.3941E−04 | 3.3274E−05 | −3.4394E−06 |
| R14 | −3.6730E+01 | −6.5055E−03 | 1.6550E−03 | −2.9944E−04 | 4.2222E−05 | −4.1106E−06 |
| | Conic coefficient | Aspherical surface coefficients | | | | |
| | k | A14 | A16 | A18 | A20 | |
| R3 | 8.0254E+01 | −5.0317E−08 | 1.6444E−09 | −3.1199E−11 | 2.5812E−13 | |
| R4 | 3.1101E−01 | 1.3823E−05 | −1.3130E−06 | 6.9247E−08 | −1.5644E−09 | |
| R5 | 3.0874E+01 | −2.2257E−06 | 1.5608E−07 | −5.4543E−09 | 6.4260E−11 | |
| R6 | −1.5499E+01 | −2.5629E−06 | 2.9740E−07 | −1.9509E−08 | 6.7635E−10 | |
| R9 | −6.2606E+02 | 1.2804E−05 | −1.4641E−06 | 9.2616E−08 | −2.4248E−09 | |

TABLE 10-continued

| | | | | |
|---|---|---|---|---|
| R10 | −3.0855E+02 | −1.7210E−05 | 1.8117E−06 | −1.0254E−07 | 2.2854E−09 |
| R11 | −3.0855E+02 | −1.7210E−05 | 1.8117E−06 | −1.0254E−07 | 2.2854E−09 |
| R12 | −7.1533E+00 | 1.0654E−06 | −5.5290E−08 | 1.6179E−09 | −1.9532E−11 |
| R13 | −4.6801E+00 | 2.4831E−07 | −1.1716E−08 | 3.2366E−10 | −4.2320E−12 |
| R14 | −3.6730E+01 | 2.6799E−07 | −1.1183E−08 | 2.7009E−10 | −2.8899E−12 |

Figure 18:
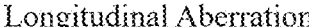
FIG. 18 is a schematic diagram of a longitudinal aberration of the camera optical lens shown in FIG. 17.
Figure 18:
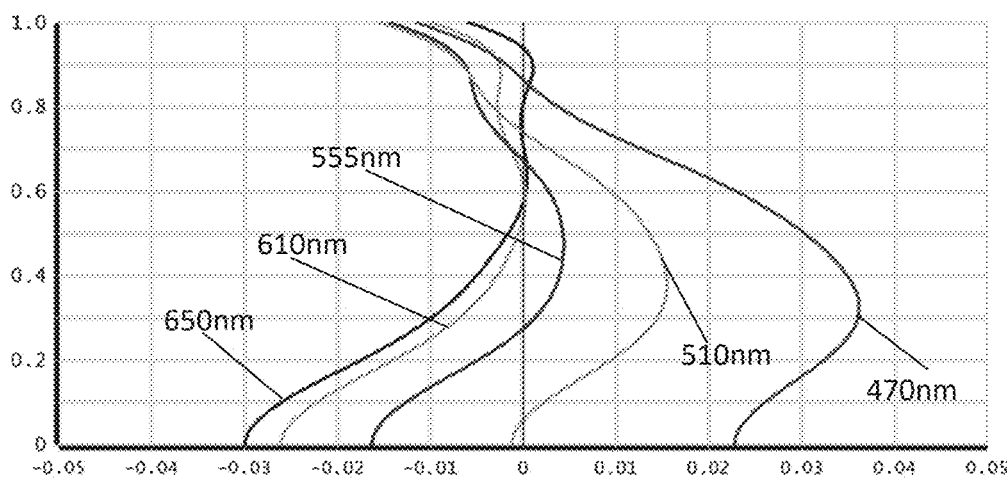
Figure 19:
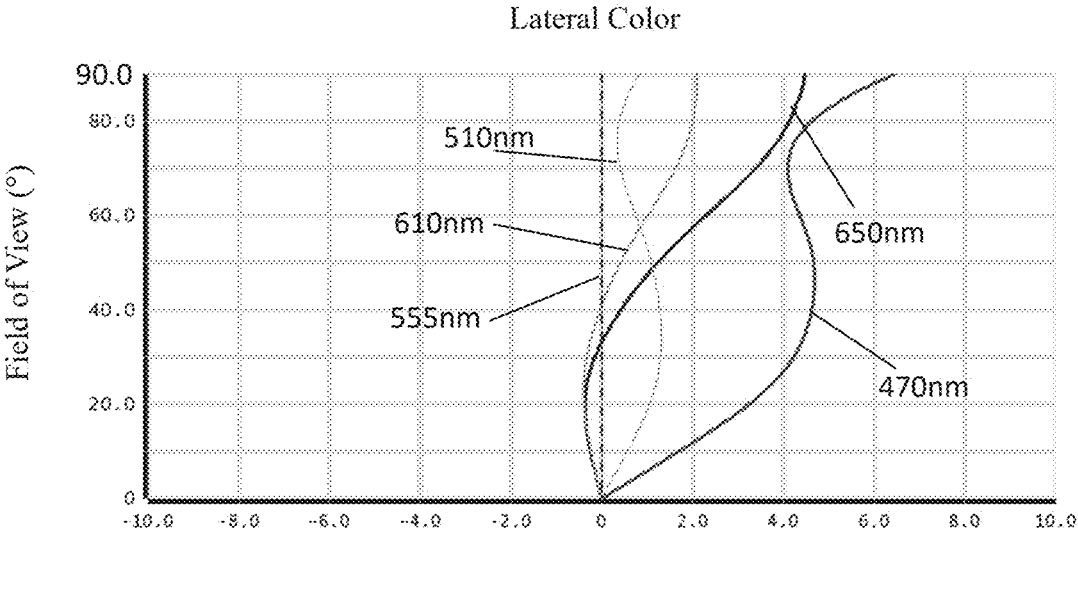
FIG. 19 is a schematic diagram of a lateral color of the camera optical lens shown in FIG. 17.
Figure 20:
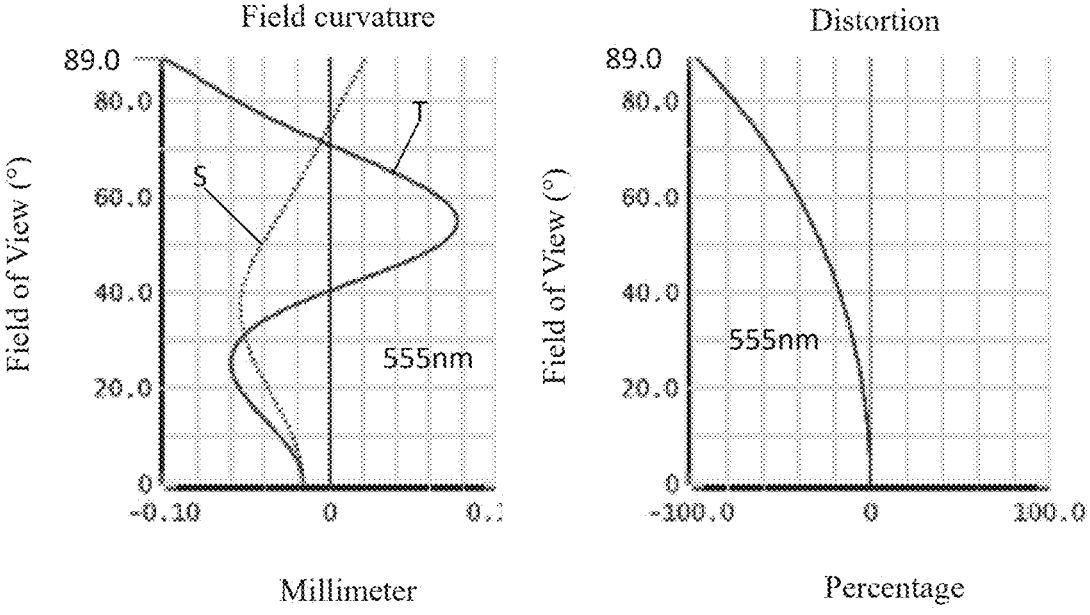
FIG. 20 is a schematic diagram of a field curvature and a distortion of the camera optical lens shown in FIG. 17.

FIG. 18 and FIG. 19 are a diagram of a longitudinal aberration and a diagram of a lateral color after light with wavelengths of 650 nm, 610 nm, 555 nm, 510 nm and 470 nm passing through the camera optical lens 50 according to the fifth embodiment, respectively. FIG. 20 is a schematic diagram of a field curvature and a distortion after light with a wavelength of 555 nm passing through the camera optical lens 50 according to the fifth embodiment. A field curvature S in FIG. 20 is a field curvature in a sagittal direction, and T is a field curvature in a meridian direction.

In this embodiment, an entrance pupil diameter ENPD of the camera optical lens 50 is 1.544 mm, an image height IH of 1.0H is 4.363 mm, and a field of view FOV in a diagonal direction is 180.00°. Thus, the camera optical lens 50 meets the design requirements of large aperture, wide angle and ultra-thinness, and the on-axis aberration and the off-axis aberration are fully corrected, thereby achieving excellent optical characteristics.

The following Table 13 shows the various values in the first, second, third, fourth and fifth embodiments and the values corresponding to the parameters specified in the conditional equations.

Comparative Embodiment

The symbols in the comparative embodiment have the same meanings as the symbols in the first embodiment.

Figure 21:
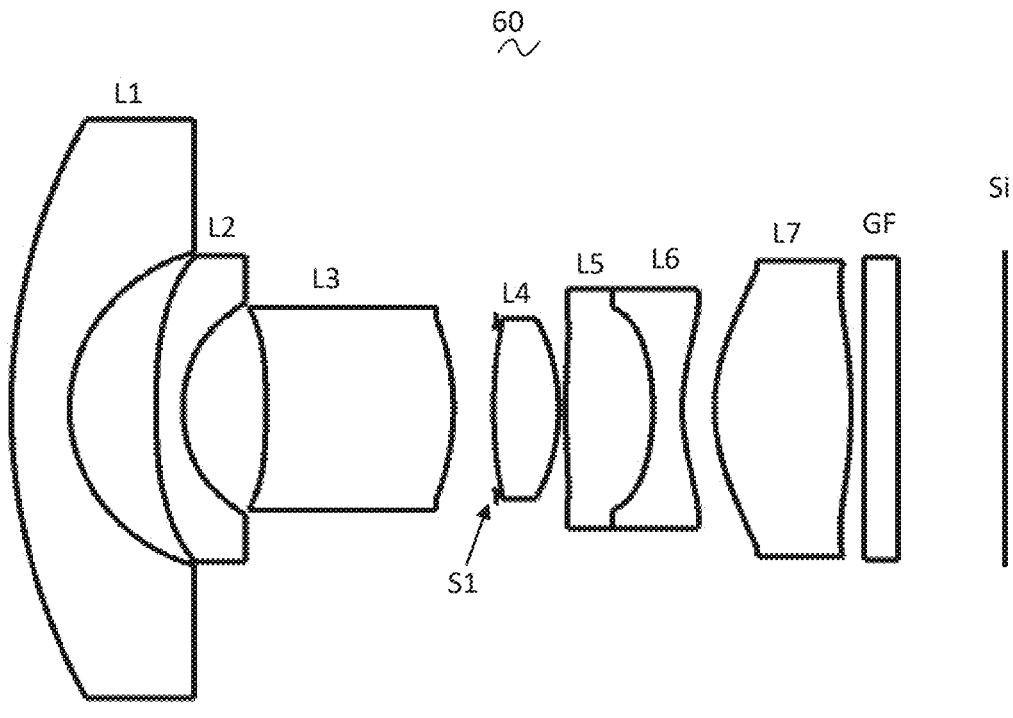
FIG. 21 is a schematic structural diagram of a camera optical lens according to a comparative embodiment.

The camera optical lens 60 according to the comparative embodiment is shown in FIG. 21.

Table 11 and table 12 show the design data of the camera optical lens 60 according to the comparative embodiment.

TABLE 11

| | R | d | | nd | | vd |
|---|---|---|---|---|---|---|
| S1 | ∞ | d0= | −12.861 | | | |
| R1 | 18.140 | d1= | 1.545 | nd1 | 1.7725 v1 | 49.61 |
| R2 | 4.664 | d2= | 2.296 | | | |
| R3 | 40.294 | d3= | 0.713 | nd2 | 1.5365 v2 | 55.98 |
| R4 | 4.480 | d4= | 2.202 | | | |
| R5 | −21.772 | d5= | 4.972 | nd3 | 1.6604 v3 | 20.53 |
| R6 | −7.915 | d6= | 1.061 | | | |
| R7 | 13.110 | d7= | 1.734 | nd4 | 1.4970 v4 | 81.59 |
| R8 | −5.729 | d8= | 0.177 | | | |
| R9 | 16.646 | d9= | 2.316 | nd5 | 1.5365 v5 | 55.98 |
| R10 | −7.617 | d10= | 0.000 | | | |
| R11 | −7.617 | d11= | 0.777 | nd6 | 1.6604 v6 | 20.53 |
| R12 | 5.326 | d12= | 0.862 | | | |
| R13 | 4.822 | d13= | 3.618 | nd7 | 1.5365 v7 | 55.98 |
| R14 | −14.113 | d14= | 0.359 | | | |
| R15 | ∞ | d15= | 0.900 | ndg | 1.5168 vg | 64.21 |
| R16 | ∞ | d16= | 2.832 | | | |

Table 12 illustrates the data of the aspherical surface of each lens in the camera optical lens 60 according to the comparative embodiment.

TABLE 12

| | Conic coefficient | Aspherical surface coefficients | | | | |
|---|---|---|---|---|---|---|
| | k | A4 | A6 | A8 | A10 | A12 |
| R3 | 6.9587E+01 | 5.5075E−03 | −7.7786E−04 | 1.1346E−04 | −1.2665E−05 | 9.7843E−07 |
| R4 | 4.7700E−01 | 6.4604E−03 | 2.3257E−04 | −6.7096E−04 | 3.3178E−04 | −8.7420E−05 |
| R5 | 3.6729E+01 | −1.8252E−03 | −5.8479E−04 | 2.7868E−04 | −9.3369E−05 | 1.8444E−05 |
| R6 | −1.2349E+01 | −4.7317E−03 | 3.4740E−04 | 3.1195E−05 | −3.4952E−05 | 1.2529E−05 |
| R9 | −9.6435E+01 | −1.6126E−03 | 2.9507E−04 | −4.0637E−04 | 2.1814E−04 | −6.7502E−05 |
| R10 | −3.1845E+01 | −1.4734E−02 | 4.0625E−03 | −4.9221E−04 | −2.0008E−04 | 9.0080E−05 |
| R11 | −3.1845E+01 | −1.4734E−02 | 4.0625E−03 | −4.9221E−04 | −2.0008E−04 | 9.0080E−05 |
| R12 | −6.8880E+00 | −5.7877E−03 | 2.1055E−03 | −5.9139E−04 | 1.0582E−04 | −1.3012E−05 |
| R13 | −3.2344E+00 | −4.5682E−03 | 1.2707E−03 | −2.3757E−04 | 3.3366E−05 | −3.4413E−06 |
| R14 | −1.7877E+02 | −6.4457E−03 | 1.6399E−03 | −3.0033E−04 | 4.2229E−05 | −4.1116E−06 |

| | Conic coefficient | Aspherical surface coefficients | | | |
|---|---|---|---|---|---|
| | k | A14 | A16 | A18 | A20 |
| R3 | 6.9587E+01 | −5.0305E−08 | 1.6452E−09 | −3.1071E−11 | 2.6863E−13 |
| R4 | 4.7700E−01 | 1.3819E−05 | −1.3135E−06 | 6.9229E−08 | −1.5634E−09 |
| R5 | 3.6729E+01 | −2.2272E−06 | 1.5576E−07 | −5.4520E−09 | 6.7970E−11 |
| R6 | −1.2349E+01 | −2.5472E−06 | 3.0147E−07 | −1.9266E−08 | 5.2017E−10 |
| R9 | −9.6435E+01 | 1.2813E−05 | −1.4642E−06 | 9.2400E−08 | −2.4694E−09 |
| R10 | −3.1845E+01 | −1.7209E−05 | 1.8146E−06 | −1.0200E−07 | 2.3514E−09 |
| R11 | −3.1845E+01 | −1.7209E−05 | 1.8146E−06 | −1.0200E−07 | 2.3514E−09 |
| R12 | −6.8880E+00 | 1.0689E−06 | −5.5038E−08 | 1.6206E−09 | −2.2772E−11 |
| R13 | −3.2344E+00 | 2.4782E−07 | −1.1744E−08 | 3.2449E−10 | −3.8463E−12 |
| R14 | −1.7877E+02 | 2.6779E−07 | −1.1194E−08 | 2.7027E−10 | −2.8110E−12 |

Figure 22:
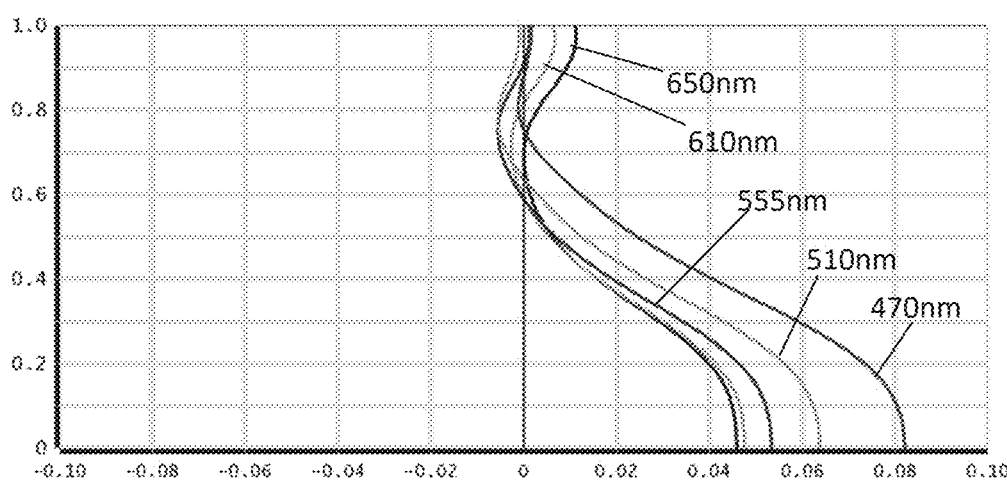
FIG. 22 is a schematic diagram of a longitudinal aberration of the camera optical lens shown in FIG. 21.
Figure 23:
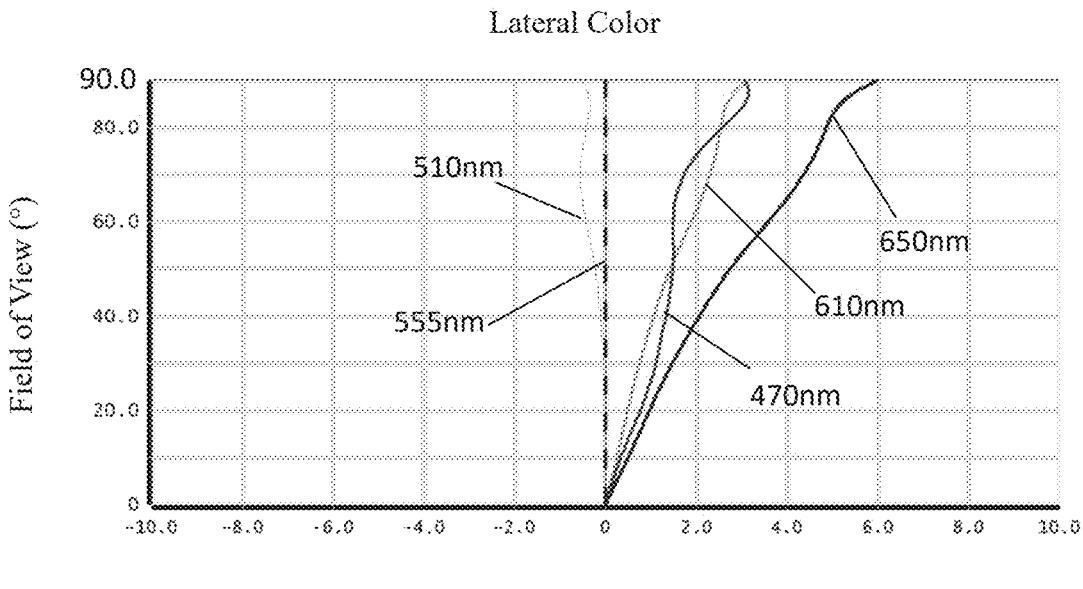
FIG. 23 is a schematic diagram of a lateral color of the camera optical lens shown in FIG. 21.
Figure 24:
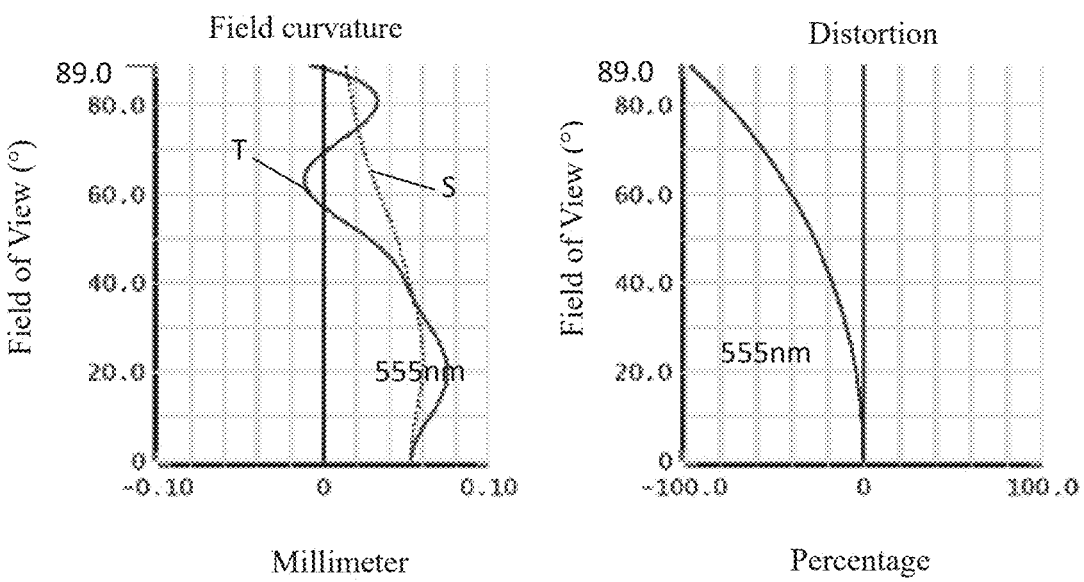
FIG. 24 is a schematic diagram of a field curvature and a distortion of the camera optical lens shown in FIG. 21.

FIG. 22 and FIG. 23 are a diagram of a longitudinal aberration and a diagram of a lateral color after light with wavelengths of 650 nm, 610 nm, 555 nm, 510 nm and 470 nm passing through the camera optical lens 60 according to the comparative embodiment, respectively. FIG. 24 is a schematic diagram of a field curvature and a distortion after light with a wavelength of 555 nm passing through the camera optical lens 60 according to the comparative embodiment. A field curvature S in FIG. 24 is a field curvature in a sagittal direction, and T is a field curvature in a meridian direction.

Table 13 below lists the values corresponding to each conditional equation in the comparative embodiment according to the above conditional equations. Apparently, the camera optical lens 60 according to the comparative embodiment does not meet the above conditional equation: $-6.50 \leq f5/f6 \leq -2.30$, and the longitudinal aberration is large.

In this embodiment, an entrance pupil diameter ENPD of the camera optical lens 60 is 1.544 mm, an image height IH of 1.0H is 4.495 mm, and a field of view FOV in a diagonal direction is 180.00°. The camera optical lens 60 does not meet the design requirements of large aperture, wide angle and ultra-thinness.

wherein f5 represents a focal length of the fifth lens;

f6 represents a focal length of the sixth lens;

d6 represents an on-axis distance between the third lens and the fourth lens;

TTL represents a total track length of the camera optical lens;

R7 represents a central curvature radius of an object-side surface of the fourth lens; and R8 represents a central curvature radius of an image-side surface of the fourth lens.

2. The camera optical lens of claim 1, wherein the camera optical lens further satisfies the following condition:

$$0.15 \leq BFL/(TTL - BFL) \leq 0.25;$$

wherein BFL represents an on-axis distance from the seventh lens to an image surface.

TABLE 13

| Parameters and Conditional equation | First Embodiment | Second Embodiment | Third Embodiment | Fourth Embodiment | Fifth Embodiment | Comparative Embodiment |
|---|---|---|---|---|---|---|
| f5/f6 | −3.988 | −6.498 | −2.314 | −3.113 | −6.852 | −2.186 |
| d6/TTL | 0.045 | 0.044 | 0.035 | 0.054 | 0.036 | 0.040 |
| R7/R8 | −2.473 | −2.686 | −3.497 | −1.801 | −2.474 | −2.288 |
| f | 2.869 | 2.924 | 2.912 | 2.850 | 2.923 | 2.916 |
| f1 | −8.358 | −9.034 | −8.826 | −7.857 | −8.569 | −8.523 |
| f2 | −9.563 | −9.506 | −9.425 | −9.109 | −8.700 | −9.431 |
| f3 | 15.784 | 15.853 | 15.610 | 15.141 | 17.185 | 16.328 |
| f4 | 8.343 | 8.089 | 8.148 | 7.995 | 8.384 | 8.257 |
| f5 | 20.559 | 34.273 | 10.872 | 13.239 | 29.738 | 10.044 |
| f6 | −5.155 | −5.275 | −4.699 | −4.253 | −4.340 | −4.595 |
| f7 | 6.101 | 5.704 | 7.235 | 6.102 | 4.531 | 7.156 |
| FNO | 1.858 | 1.894 | 1.886 | 1.846 | 1.893 | 1.888 |
| TTL | 27.452 | 26.331 | 23.938 | 27.660 | 26.194 | 26.364 |
| IH | 4.320 | 4.410 | 4.512 | 4.349 | 4.363 | 4.495 |
| FOV | 180.000 | 180.074 | 180.000 | 180.000 | 180.000 | 180.00 |

It can be understood by those skilled in the art that the above embodiments are specific embodiments for realizing the present disclosure. However, in practical application, various changes can be made in form and detail without departing from the spirit and scope of the present disclosure.

What is claimed is:

1. A camera optical lens, comprising seven lenses in sequence from an object side to an image side: a first lens with a negative refractive power, a second lens with a negative refractive power, a third lens with a positive refractive power, a fourth lens with a positive refractive power, a fifth lens with a positive refractive power, a sixth lens with a negative refractive power, and a seventh lens with a positive refractive power;

wherein the camera optical lens satisfies the following conditions:

$$-6.50 \leq f5/f6 \leq -2.30;$$

$$0.035 \leq d6/TTL \leq 0.055; \text{ and}$$

$$-3.50 \leq R7/R8 \leq -1.80;$$

3. The camera optical lens of claim 1, wherein the camera optical lens further satisfies the following condition:

$$1.50 \leq f7/f \leq 2.50;$$

wherein f7 represents a focal length of the seventh lens, and f represents a focal length of the camera optical lens.

4. The camera optical lens of claim 1, wherein the camera optical lens further satisfies the following condition:

$$35.00 \leq v5 - v6 \leq 70.00;$$

wherein v5 represents an Abbe number of the fifth lens, and v6 represents an Abbe number of the sixth lens.

5. The camera optical lens of claim 1, wherein the camera optical lens further satisfies the following condition:

$$1.70 \leq n1 \leq 2.20;$$

wherein n1 represents a refractive index of the first lens.

6. The camera optical lens of claim 1, wherein the first lens has a convex object-side surface in a paraxial region, and has a concave image-side surface in the paraxial region;

wherein the camera optical lens further satisfies the following conditions:

$$-6.18 \le f1/f \le -1.84;$$

$$0.83 \le (R1 + R2)/(R1 - R2) \le 2.99; \text{ and}$$

$$0.02 \le d1/TTL \le 0.11;$$

wherein f1 represents a focal length of the first lens;

f represents a focal length of the camera optical lens;

R1 represents a central curvature radius of the object-side surface of the first lens;

R2 represents a central curvature radius of the image-side surface of the first lens; and d1 represent an on-axis thickness of the first lens.

7. The camera optical lens of claim 1, wherein the second lens has a convex object-side surface in a paraxial region, and has a concave image-side surface in the paraxial region;

wherein the camera optical lens further satisfies the following conditions:

$$-6.67 \le f2/f \le -1.98;$$

$$0.53 \le (R3 + R4)/(R3 - R4) \le 1.90; \text{ and}$$

$$0.003 \le d3/TTL \le 0.06;$$

wherein f2 represents a focal length of the second lens;

f represents a focal length of the camera optical lens;

R3 represents a central curvature radius of the object-side surface of the second lens;

R4 represents a central curvature radius of the image-side surface of the second lens; and d3 represents an on-axis thickness of the second lens.

8. The camera optical lens of claim 1, wherein the third lens has a concave object-side surface in a paraxial region, and has a convex image-side surface in the paraxial region;

wherein the camera optical lens further satisfies the following conditions:

$$2.66 \le f3/f \le 8.82;$$

$$1.05 \le (R5 + R6)/(R5 - R6) \le 3.65; \text{ and}$$

$$0.09 \le d5/TTL \le 0.31;$$

wherein f3 represents a focal length of the third lens;

f represents a focal length of the camera optical lens;

R5 represents a central curvature radius of the object-side surface of the third lens;

R6 represents a central curvature radius of the image-side surface of the third lens; and d5 represents an on-axis thickness of the third lens.

9. The camera optical lens of claim 1, wherein the fourth lens has a convex object-side surface in a paraxial region, and has a convex image-side surface in the paraxial region;

wherein the camera optical lens further satisfies the following conditions:

$$1.38 \le f4/f \le 4.36; \text{ and}$$

$$0.03 \le d7/TTL \le 0.14;$$

wherein f4 represents a focal length of the fourth lens;

f represents a focal length of the camera optical lens; and d7 represents an on-axis thickness of the fourth lens.

10. The camera optical lens of claim 1, wherein the fifth lens has a convex object-side surface in a paraxial region, and has a convex image-side surface in the paraxial region;

wherein the camera optical lens further satisfies the following conditions:

$$1.87 \le f5/f \le 17.58;$$

$$-0.25 \le (R9 + R10)/(R9 - R10) \le 0.43; \text{ and}$$

$$0.04 \le d9/TTL \le 0.15;$$

wherein f5 represents a focal length of the fifth lens;

f represents a focal length of the camera optical lens;

R9 represents a central curvature radius of the object-side surface of the fifth lens;

R10 represents a central curvature radius of the image-side surface of the fifth lens; and d9 represents an on-axis thickness of the fifth lens.

11. The camera optical lens of claim 1, wherein the sixth lens has a concave object-side surface in a paraxial region, and has a concave image-side surface in the paraxial region;

wherein the camera optical lens further satisfies the following conditions:

$$-3.61 \le f6/f \le -0.99;$$

$$0.18 \le (R11 + R12)/(R11 - R12) \le 1.24; \text{ and}$$

$$0.02 \le d11/TTL \le 0.06;$$

wherein f6 represents a focal length of the sixth lens;

f represents a focal length of the camera optical lens f;

R11 represents a central curvature radius of the object-side surface of the sixth lens;

R12 represents a central curvature radius of the image-side surface of the sixth lens; and d11 represents an on-axis thickness d11 of the sixth lens.

12. The camera optical lens of claim 1, wherein the seventh lens has a convex object-side surface in a paraxial region, and has a convex image-side surface in the paraxial region;

wherein the camera optical lens further satisfies the following conditions:

$$-0.98 \le (R13 + R14)/(R13 - R14) \le -0.26; \text{ and}$$

$$0.04 \le d13/TTL \le 0.21;$$

wherein R13 represents a central curvature radius of the object-side surface of the seventh lens;

R14 represents a central curvature radius of the image-side surface of the seventh lens and d13 represents an on-axis thickness of the seventh lens.

13. The camera optical lens of claim 1, wherein the first lens is made of glass and the fourth lens is made of glass.

* * * * *